United States Patent [19]

Cunningham et al.

[11] Patent Number: 5,041,992
[45] Date of Patent: Aug. 20, 1991

[54] INTERACTIVE METHOD OF DEVELOPING SOFTWARE INTERFACES

[75] Inventors: Robert E. Cunningham, Palo Alto, Calif.; Jeffery G. Bonar, Pttsburgh; John D. Corbett, both of Pittsburgh, Pa.

[73] Assignee: University of Pittsburgh, Pittsburgh, Pa.

[21] Appl. No.: 261,770

[22] Filed: Oct. 24, 1988

[51] Int. Cl.$^5$ .............................................. G06F 3/153
[52] U.S. Cl. ................................... 364/518; 364/521; 340/721; 340/747
[58] Field of Search ... 364/200 MS File, 900 MS File, 364/300 MS File, 146, 147, 518, 521, 188–193; 340/709, 721, 747

[56] References Cited

U.S. PATENT DOCUMENTS

4,813,013  3/1989  Dunn .................................... 364/900
4,866,639  9/1989  Cosentino et al. ................... 364/521

OTHER PUBLICATIONS

"Software Frameworks", Gregg Williams, *BYTE* Magazine, Dec. 1984, vol. 9, No. 13, pp. 124–127 and 384 and 386, McGraw-Hill Publication.
"Easel Author's Guide", Interactive Images, Inc., Woburn, Mass., Version 4.1, Dec. 1987.
"Macapp: An Application Framework", Kurk J. Schmucker, *BYTE* Magazine, Aug. 1986, vol. 11, No. 8, pp. 189, 190, 192 and 193, McGraw-Hill Publication.
"Objects, Icons, and Software-ICS", Brad Cox and Bill Hunt, *BYTE* Magazine, Aug. 1986, vol. 11, No. 8, pp. 161, 162, 164, 166, 168, 169, 170, 172, 174 and 176, McGraw Hill Publication.
"Object-Oriented Programming: Themes and Variations", Mark Stefik and Daniel G. Bobrow, *The AI Magazine*, Winter 1986, pp. 40–62.
"Raster Operations", John Bennett, *BYTE* Magazine, Nov. 1985, vol. 10, No, 12, pp. 187, 188, 190, 192, 194, 196, 199, 200, 202 and 203. McGraw-Hill Publication.

*Primary Examiner*—David L. Clark
*Attorney, Agent, or Firm*—Webb, Burden, Ziesenheim & Webb

[57] ABSTRACT

A system and method for interactive design of user manipulable graphic elements. A computer has display and stored tasks wherein the appearance of graphic elements and methods for their manipulation are defined. Each graphic element is defined by at least one figure specification, one mask specification and one map specification. An interactive display editor program defines specifications of said graphic elements. An interactive program editor program defines programming data and methods associated with said graphic elements. A display program uses the figure, map and mask specifications for assembling graphic elements upon the display and enabling user manipulation of said graphic elements.

17 Claims, 2 Drawing Sheets

INTERACTIVE METHOD OF DEVELOPING SOFTWARE INTERFACES

BACKGROUND OF THE INVENTION

This application relates to systems and methods for design of interactive interfaces for computer programs.

Computer programs are a series of instructions that direct the operation of a computer. They are written by computer programmers to achieve a desired purpose. The instructions, taken as a whole, may define a computer application such as a word processing system, an accounting system, an inventory system or an arcade game. Most programs require interaction with the user of the computer program. In the case of a word processing program, the user keys text, formats and prints documents. In the case of an accounting program, the user enters the desired debits and credits and appropriate documentation, posts and selects reports. The schemes used to prompt the computer user to input data and to output information generated by the computer program to the computer user are known as human/computer interfaces.

This application relates to systems and methods that facilitate the computer programmer's task of writing programs with human/computer interfaces that are readily understandable and easy to use.

More and more, human/computer interfaces (whatever the application) make use of certain devices such as menus, windows, scroll bars, graphical displays, in addition to the traditional and still essential keypad and keyboard. Especially popular are direct manipulation interfaces (DMI) which are human/computer interfaces that allow the user to command the computer by selecting and manipulating pictures (sometimes called icons), usually with a pointing device such as a mouse. (A mouse is simply an input device which, when moved over a surface, "drags" a mouse pointer over the computer display. Typically, a mouse has several buttons which when pressed, initiate an input relating the button pusher and the location of the mouse cursor upon the computer display. The pressing or releasing of a mouse button is often referred to as a "mouse event".) The pictures of a DMI are designed to behave somewhat like the objects they represent. The Apple Macintosh employs direct manipulation extensively and is widely considered one of the easiest computers to use for people who are not necessarily computer specialists. The advantages of direct manipulation are widely recognized.

Unfortunately, direct manipulation interfaces are difficult to construct and difficult to modify once they are constructed. The programmer needs to write programs to create the pictures, move the pictures around the screen, determine what pictures the mouse is pointing to, what the pictures on the screen represent, what to do when a picture is selected and so forth. Although some programming languages and tools provide commands for drawing geometric figures and ways of sensing the mouse events, these basic capabilities are only the beginnings of a direct manipulation interface. Traditional programming languages leave the programmer to construct more sophisticated objects, such as menus. This is time consuming and often leads to complex and idiosyncratic interfaces.

User interface management systems are known which are computer programs that provide a collection of interface elements such as menus and dialog boxes and often include interactive tools for building prototype interfaces. See, for example, "Software Frameworks" *Byte* December 1984, describing Apple Computers Toolkit/32; "Macapp: An Application Framework", *Byte* August 1986; and "Objects, Icons and Software-ICS", *Byte* August 1986.

If a user interface management system has an interactive interface itself, it may be possible to create entire application interfaces without programming. For some applications, a good user interface management system may be sufficient. However, it is not always clear what interface elements and interactive tools will be needed and the interface elements and tools may not be readily modified or modified at all to suit the specific application.

Current estimates indicate that interface design can consume 50 percent of the time on a large programming project. Interfaces produced are usually difficult to debug and modify. Even though carefully thought out, interfaces are likely to need to be redesigned when tried with real users.

SUMMARY OF THE INVENTION to simplify the development of sophisticated interfaces.

It is a further advantage to cut the time needed to implement an interface by as much as a factor of 10.

It is yet another advantage to allow interfaces to be quickly and easily designed, thoroughly tested and then discarded for more effective redesigns.

It is an advantage according to this invention that graphic elements on computer displays can be created, displayed and manipulated directly. The displays comprising the interface can be simply saved and restored.

It is an advantage according to this invention to allow the programmer to treat an interface as an object for inspection, manipulation and design.

According to this invention, the programmer uses graphic editors to mock up interface designs by drawing and arranging objects that appear on the computer display. The application underneath the interface is created by "building inward" from this mock-up. Typically, the programmer is building a direct manipulation interface which allows the user to command the computer by moving and selecting icons designed to behave like the objects they represent.

Briefly, according to this invention, there is provided a system for the interactive design of user manipulable graphic elements. The system comprises a computer having a bit and stored tasks. The appearance or sensitivity of graphic elements are defined by at least one figure specification and one other type specification, such as a mask specification or a map specification. Figure specifications define the outline and shading of graphic elements. Mask specifications define the transparent and nontransparent portions of graphic elements. Map specifications define the sensitive, for example, mouse pointer sensitive areas of graphic elements. An interactive display editor program is provided for defining the specifications of said graphic elements. An interactive program editor program is provided for programming data and methods associated with said graphic elements. A display program using the figure specifications and the other type specifications is provided for assembling graphic elements upon the display and enabling user manipulation of said graphic elements. Preferably, the figure, map and mask specifications are bit mapped specifications.

It is most preferred, according to this invention, that the display editor be capable of copying specifications of one type for use in generating specifications of another type. In other words, once the figure specification has been generated, the mask and map specifications can be generated by copying and modifying the figure specification. This results in rapid programming and insures alignment of the various specifications.

According to one embodiment of this invention, multiple sets of figure, map and mask specifications are generated. The copying feature of the display editor enables the generation of alternate sets of specifications where they have common features and require alignment.

In one preferred embodiment according to this invention, the computer has stored tasks comprising an object oriented programming environment wherein the appearance of said graphic elements and methods for their manipulation are defined by display objects, each said display object comprising at least one figure specification instance variable and one other type specification instance variable.

Where the other type specification is a mask specification defining the nontransparent portions of said graphic element, the display editor or said program editor is used to establish a list defining occlusion priorities of graphic elements. The display program for assembling graphic elements upon the display comprises an algorithm for controlling the display such that the masked portions of graphic elements with a higher occlusion priority mask the overlaid portions of a graphic elements with a lower occlusion priority.

Where the other type specification comprises map specifications defining mouse sensitive portions of said graphic element, it may comprise a plurality of specifications organized as a tagged list or list tree of bit maps. The program editor is used for defining methods activated when the mouse is used to bring the mouse cursor over the mouse sensitive areas of the graphics element and a mouse button is pushed. The display program has algorithms for recognizing when a mouse button has been pushed while the mouse cursor is within a mouse sensitive area. The algorithm preferably comprises a depth first search of the tagged list tree.

There is also provided, according to this invention, a computer assisted process for the interactive design of user manipulable graphic elements displayed upon a computer display. The method requires an interactive display editor program for defining specifications of graphic elements, a program editor for programming data and methods associated with graphic elements, and a display program for assembling graphic elements upon the display and enabling the manipulation of graphic elements. The method comprises a first step of using the display editor to interactively define the figure specification of a graphic element and a subsequent step of the display editor to interactively define at least one other type specification. According to a preferred embodiment, the method requires a computer having an object oriented programming environment wherein the appearance of said graphic elements and methods for their manipulation are defined by display objects, an interactive display editor program for defining specifications of display objects, a program editor program for programming data and methods assigned to display objects and other program objects, and a display program for assembling graphic elements upon the display and enabling the interactive positioning and repositioning of graphic elements at locations within a window. The method comprises the step of invoking the display editor to interactively define the figure specification of a graphic element, the data for which is stored in at least one instance variable associated with a display object, the step of using the display editor to interactively define a mask specification defining the transparent and nontransparent portions of said graphic element, or to interactively define a map specification defining sensitive areas, the data for which is stored in at least one instance variable associated with said display object, and repeating prior steps to define a plurality of display objects.

An additional step may comprise using either the display editor or the program editor to assign occlusion priorities to each display object such that when the display program is invoked to move one graphic element to the same position as another, the masked portions of a graphic element with a higher occlusion priority mask the overlaid portions of the graphic elements with a lower occlusion priority.

Yet another additional step may comprise invoking the program editor to define methods or messages activated when the mouse is used to bring the mouse cursor over the mouse sensitive areas of the graphic element and a mouse button is pushed.

In an especially preferred method, the display editor is used to copy an existing specification for generating another specification by the modification thereof.

BRIEF DESCRIPTION OF THE DRAWINGS

Further features and other objects and advantages will become apparent from the following description made with reference to the drawings in which.

DESCRIPTION OF THE PREFERRED EMBODIMENTS

Figure 1A:
FIGS. 1(a) and 1(b), respectively, illustrate figure and mask specifications.

While not entirely essential to the implementation of the applicants' invention, it is most easily implemented in object oriented programming environments. The nature of object oriented programming has been explained in detail in the literature. For example, *Small-Talk 80: The Language and its Implementation,* Goldberg and Robeson, 1983; numerous articles in the August 1981 and August 1986 issues of *Byte;* "Object-Oriented programming: Themes and Variations", Stefik and Bobrow, *The AI Magazine,* Winter 1986.

In an object oriented programming language, the fundamental data structures of the language are objects, programming elements that contain a specification of both data and actions. Data are specified in local variables referred to as instance variable (or IVs, for short) contained within the object. Actions or methods are subprograms that operate on the variables. Methods are invoked by messages sent from one object to itself or other objects.

There are two fundamental kinds of objects: classes and instances. Classes define a set of variables and methods and can be thought of as templates for object types. Instances are particular instantiations of a class. An instance provides storage for variables defined in its class. Each instance has its own version of those variables. When a message is sent to an instance, the instance looks to methods defined in its class to specify how the message is to be executed.

Classes are defined in terms of class hierarchy. A class inherits all variables and methods from classes referred to as superclasses. The variables and methods inherited from a superclass are available to the inheriting class as if they were defined within the inheriting class. A class can be referred to as a subclass or a child class of its superclasses. Note, that if a subclass has multiple superclasses, all the variables and methods from each superclass are inherited. This is often referred to as multiple inheritance.

There are two kinds of variables that can be defined within a class. Class variables, which are referred to as CVs, define variables whose storage is shared by all instances of the defining class. Class variables are typically used for coordination between classes instances. Instance variables (IVs define variables where a separate storage space is allocated for each instance. All instances have their own copy of instance variables.

Methods specify the action to be performed when a message is sent to an object. When the message is sent to an object, the message name is matched against method names defined for that object. The method actually executed is the method with the same name as the message that is defined lowest in that object's class hierarchy.

Messages can have parameters. When a message is sent, all actual parameters are fully evaluated before a method is located for that message. Methods have formal parameters, corresponding to the actual parameters in the message, and temporary variables. Temporary variables may be created when a message is executed, are available only within the scope of that method while the method is executing.

Programs perform by sending messages to objects which invoke a method in an object's class. Often methods send messages to other objects invoking other methods. Each method returns a result to the sender. At the heart of many languages and especially an object oriented language is a program segment for interpreting and evaluating messages and keeping track of where to return when messages call other messages. The applicants, invention does not reside in the particular implementation of this program segment.

Object oriented programming can be implemented with any number of programming languages. Object oriented programming environments have been implemented in the LISP language, in the C language and in others. For example, Interlisp-D has been extended to provide the LOOPS programming environment. See "Object-Oriented Programming: Themes and Variations", Stefik and Bobrow, *The AI Magazine,* Winter 1986 and *The LOOPS Manual,* Bobrow and Stefik, Xerox Corporation 1983.

Interlisp-D/LOOPS runs on a Xerox 1100 Series Work station. A work station is simply a single user computer with a large graphics display, several megabytes of memory, a high speed processor and a device for pointing to objects on the display, such as a mouse. Work stations have bit mapped displays. In a bit mapped display, a portion of the computers memory is dedicated to storing the screen bit map. Each pixel on the display corresponds to at least one bit of memory in the screen bit map. In the case of a CRT display, as the raster is scanned, the video signal for any given pixel is controlled by the corresponding bit or bits in the screen bit map. Programs and apparatus for reading the screen bit map and feeding the information therein to the video input of the CRT in synchronism with the horizontal and video scanning signals are well known and form no part of this invention.

Systems software for work stations typically comprises a number of operations for transferring scratch bit maps to the screen bit map and for combining scratch bit maps. A popular tool for manipulating bit maps is BITBLT also known as RasterOp. BITBLT is a general purpose procedure for copying, moving and combining portions of bit maps. It is described in *Principles of Interactive Computer Graphics,* Newman and Sproull, McGraw Hill 1979. See also "The SmallTalk Graphics Kern", *Byte Magazine* August 1981, and "Raster Operations", *Byte Magazine,* November 1985.

Bit maps may be generated directly with bit map editors that display a large pixel representation of the bit map upon a display screen and allow the programmer to black in or clear individual pixels. Use of such a bit map editor is obviously tedious. Another form of graphics editor is known as a object graphics editor. Object graphics editors respond to commands to draw and erase lines and circles and other shapes and to fill and clear specified areas. The graphics editor builds a list of commands for describing an image. Before the object graphics generated image can be displayed on a bit mapped display, it must be converted to a bit map. Object graphics editors often include such a utility. An object graphics editor known as "Sketch" is available as a drawing program for the Interlisp-D environment. It enables the interactive construction of figures from a combination of text and graphics. A sketch created by the "Sketch" program consists of elements such as text, lines and curves, boxes, circles and ellipses. Each element has one or more positions that determine the location and shape and a set of properties that determine how it looks. Sketch is an interactive graphics editor in that locations upon the display may be designated by use of a mouse cursor and mouse events. Object graphics editors are known in the art. "Sketch" is described in *A Users Guide To Sketch-The Interlisp Drawing System,* Xerox Corporation, 1985. "McDraw" is an object graphics editor widely known to Apple Macintosh users.

Common to most object oriented programming environments are commands that may be issued from the keyboard or with the mouse pointer for creating and modifying classes and specializing classes to create new objects. "Systems classes" define how objects, instances, instance variables (IVs), classes, class variables (CVs) and messages can be created, destroyed, edited or manipulated. For example, the highest level of class may be named "Object" having no parent class and no IVs. Its methods may comprise setting the name of an Object or destroying an Object. The system classes may include a class named "Class" which has only the parent class of Object. It has no IVs and provides methods for specialization of classes, modification of classes and so forth. The system classes may also include a class named "File" which provides for files containing object oriented code and includes methods for creating, saving and loading such files.

Also common to most object oriented programming environments are certain "tool classes" that aid the developer (computer programmer) in designing, implementing and debugging applications. Tool classes might include a class named "CodeEditor" that enables the user to interactively edit code, a class named "BreakWindow" that enables the programmer to observe the performance of a section of code by observing bindings of variables within a method, a class named "ClassBrowser" which is a window that displays the portions of a class hierarchy associated with the file or group of files and shows the order between classes graphically and allows more detailed viewing and modification of classes. Still further, the tool classes of a typical object oriented programming environment may include a class named "Dependence/Browser" which is an editing window that enables the user to graphically view the dependencies (and hierarchies, if any) between specified objects, and a class named "Object Inspector" which is an editing window that shows the IVs, names, and values of IVs, allowing the user to perform interactive editing. The specific names of the system classes and tool classes identified in this paragraph are arbitrary and the name and functionality vary from environment to environment. The Interlisp-D/Loops programming environment provides variations of the system classes and tool classes described in this paragraph and was used by the applicants to implement a specific embodiment of the invention disclosed herein. That embodiment is described in *Chips: A Tool for Developing Software Interfaces Interactively*, Cunningham, Corbett and Bonar, (Technical Report No. LSP-4 supported by Office of Naval Research dated Oct. 23, 1987).

In the practice of this invention, certain special "tool classes" and "user interface classes" are used to implement the inventive systems and procedures. One class of objects may be referred to as "DomainObjects". This class defines special objects in the application domain—the domain for which the interface is being built. DomainObjects provide the functionality of describing situations, processes or objects from the application domain for which the program is being built. In addition, DomainObjects connect themselves to other domain objects, defining their behavior in terms of other domain objects, saving themselves to a file, and editing their behavior and properties interactively.

Each instance of a subclass of DomainObject defines one or more instances of the class "DisplayObject" that determines how the domain object is to be displayed. The domain object corresponds to an object in the application domain, while the display object determines how the domain object will display itself on the screen. For example, there might be a class of domain objects called LightBulb. It has display objects associated with it that determine how it will show up on the screen. The domain object instance itself determines the objects behavior (for example, is it "on" or "off"). It determines how to process inputs, controls its display objects in response to inputs, and connects to other domain objects. Display objects are stored in the DomainObject classes IV, "displayObjects", as an associated list of the form ((tag$_1$ displayObjectInstance$_1$) ... (tag$_n$ displayObjectInstance$_n$)). Where tag$_i$ is a name for the display objected. For the domain object LightBulb, displayObjectInstance1, may be the image of an unilluminated light bulb and displayObjectInstance2, might be an image of an illuminated light bulb. The domain object, depending upon its condition ("on" or "off") sends one or the other display object instance to the screen. Each instance of DomainObject class stores one or more display objects in its displayObjects IV. These display objects instances are copies of those stored in the classes display objects IV.

As already stated, the display objects determine how a domain object will display itself on the screen. Display objects are the basic user interface object in the applicants' system. The class DisplayObject provides functionality for the overlapping display of irregularly shaped, noncontinuous objects, the functionality for button detection in response to buttoning (mouse events). Preferably, anything that is displayed on the screen in the applicants' system is either an instance of or an instance of a specification of, the class DisplayObject. Applicants' invention can be implemented by combining the functions described above for domain objects and display objects into a single type object.

Preferred instance variables and messages or methods for display objects according to this invention are set forth in the following table.

TABLE I
DISPLAY OBJECT

Parents:
Object
IVS:

| | |
|---|---|
| figure specification | bitmap version of image |
| mask specification | bitmap version of mask |
| map specification | (tag1 offset1 bitmap1 tagn offsetn bitmapn ...) |
| position | screen position |
| responsesToSelection | (tag1 button msgOrCode1 ... tagn button msgOrCoden) |
| occludesMe | list of display objects that occludes this one. |
| occludedByMe | list of display objects that this one occludes. |

Messages:

aDspObj ← Paint(dspBM, x, y)
    paints the image IV of aDspObj onto the bitmap dspBM at x, y aDspObj ← Replace(dspBm, x, y)
    replaces the section of the bitmap dspBM at x, y with the image IV of aDspObj aDsoObj ← Invert(dspBM, x, y) ·
    inverts the image IV of aDspObj and places it on the bitmap dspBM at x,y aDspObj ← Erase(dspBM, x, y)
    erases the image IV of aDspObj on the bitmap dspBM at x, y aDspObj ← PlaceOnScreen(xOrPos, y)
    places aDspObj on the screen at the position defined by xOrPos and y, updating the screen manager appropriately aDspObj ← Flash(dspBM, x, y)
    flashes aDspObj

TABLE I-continued
DISPLAY OBJECT aDspObj ← RemoveFromScreen( )
    removes aDspObj from screen aDspObj ← ToTop( ) brings aDspObj to top of
    screen, that is, on top of all
    OccludedBy objects aDspObj ← Bury( ) buries aDspObj , that is, below
    all Occludes objects aDspObj ← On You?(x,y) returns true if the position
    defined by x, y is on aDspObj aDspObj ← RespondToSelection(tag, button, x, y)

aDspObj ← Drag(stop, coordlist)
    drags aDspObj along coordlist
    if given, otherwise follows
    mouse until stop condition is
    met aDspObj ← Move(x, y) moves aDspObj to position
    defined by x, y aDspObj ← EditAppearance( )
    edits appearance of aDspObj aDspObj ← Occludes(obj)
    adds obj to occludedByMe IV aDspObj ← OccludedBy(obj)
    adds obj to occludesME IV aDspObj ← DoesntOcclude(obj)
    removes obj from occludedByMe IV aDspObj ← IsntOccludedBy(obj)
    removes obj from occludesME IV aDspObj ← GetOverlaps( )
    returns objects that are
    overlapped by aDspObj aDspObj ← OfferEditOptions( )
    pops up menu of edit options
    for aDspObj In the Table, the message names are to the right of the arrow followed by message parameters in parentheses. The type of instance to which the message can be sent is to the left of the arrow. The arrow could be read as "sent to" where the message description is read right to left.

The figure specification, mask specification and each element of the map specification of a display object each comprise at least one bit map. Figure, map and mask bit map specifications are themselves objects and preferably have at least the instance variables and methods as generally described in Table II.

TABLE II
BITMAP

Parents:
Object
IVS:
width          width of bitmap
height         height of bitmap
Messages:

aBM ← Paint(dspBM, x, y)
    paints the image IV of aBM onto
    the bitmap dspBM at x, y aBM ← Replace(dspBM, x, y)
    replaces the section of the
    bitmap dspBM at x, y with the
    image IV of aBM aBM ← Invert(dspBM, x, y)
    inverts the image IV of aBM and
    places it on the bitmap dspBM
    at x, y aBM ← Erase(dspBM, x, y)
    erases the image IV of aBM on
    the bitmap dspBM at x, y aBM ← BitBlt(scrx, scry, arg, targx, targy, wid, ht, mix)
    transfers section of aBM to
    another bitmap aBM ← OnYou?(x,y) returns true if position x, y
    is on aBM aBM ← SetBit(x, y, color)
    sets bit at x, y to color In a preferred embodiment of this invention, the figure, map and mask specifications may comprise two different specifications, namely, a display representation which is the bit map representation already described and an editor representation which is a list of object graphic commands in a format recognized by the display editor (to be described). The object graphics commands are more easily edited; however, the edit representation comprising a list of object graphic commands must be converted to a bit map representation for it to be displayed.

Figure 1B:
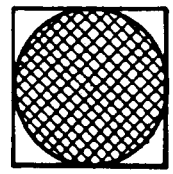

The figure specification defines the way the display object will appear on the display (outlines, color, shading). The mask of the display object defines which areas of the display object are to be opaque. Referring to FIGS. 1(a) and 1(b), the figure specification and mask specification, respectively, for a SmileFace display object are shown.

Figure 2A:
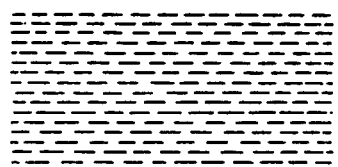
FIGS. 2(a), 2(b) and 2(c) illustrate the process of erasing a mask and painting a figure.
Figure 2B:
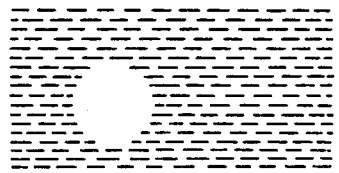
Figure 2C:
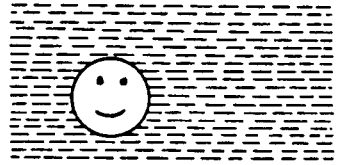

Using this scheme, it is possible to display a figure of arbitrary shape on an arbitrary background. Referring now to FIG. 2(a), there is shown a background defined by a scratch bit map which is an instance of the class BitMap. (See Table II). The mask specification of the SmileFace object can be sent the message Erase with the scratch bit map as a destination parameter. The result is shown in FIG. 2(b). Next, the figure specification is sent the message Paint with the scratch bit map as a destination parameter. The result in shown in FIG. 3. Finally, the image of the SmileFace object can be transferred to the screen bit map be sending the scratch bit map the message Paint with the screen bit map as the destination parameter. The erasing and painting procedure using a scratch bit map is called double buffering and avoids flicker associated with erasing from the screen bit map.

The system, according to this invention, creates the illusion that display objects assembled upon the screen overlap one another as though the screen had depth and some display objects are closer than others. An ordered "contents" list is maintained of all display objects assembled on the screen bit map and, therefore, the screen at any time. When the screen is first displayed (as when the file containing the application is loaded or when the screen is redisplayed) each display object in the order contents list is sent the message PlaceOnScreen starting with the last display object in the list and proceeding to the first. As each display object is placed on the screen, its mask and figure bit maps are erased and painted, respectively, on the screen bit map. The occludesMe list is an ordered list of all display objects that are nearer to the front of the contents list than the display object and at an overlapping screen location. The occludedByMe list is an ordered list of all display objects in the contents list further from the front of contents list than the display object and at a screen position overlapped by the display object. The purpose of keeping the occludesMe and occludedByMe list will become apparent.

When a display object is sent the message Move to a new position defined by the parameters x and y (pixel coordinates measured from the lower left corner of the screen), each display object in the occludedByMe IV is sent the message Replace with a scratch bit map (having the same height and width as the display object being moved) as the destination parameter. Then, the message Replace is sent to each display object in the occludedByMe IV. The same registry of the display objects on the screen is maintained on the scratch bit map. (Consider that other display objects may only partially overlap the display object being Moved.) The scratch bit map is then Replaced on the screen bit map. The occludesMe and occludedByMe list of each overlapped and overlapping display object are then updated and everything is removed from the moved display objects own occludesMe IV and occludedByMe IV. The moved display object is now placed at the front of the contents list. (Note, to this point the Move method may be identical with the RemoveFromScreen method except that the RemoveFromScreen procedure also removes the display object from the contents list). The next step in the Move method is to send each display object in the contents list the message OnYou? using the new coordinates of the display object as the parameters. It then sends the message PlaceOnScreen to each display object upon which it landed and then to itself. Finally, it adds itself to the front of the occludesMe list of each display object upon which it landed and it adds each display object upon which it landed to its occludedByMe list. The occludesMe and occludedByMe list enable the rapid moving or removal of display objects from the screen.

There are any number of other sequences that could implement the Move method described above and the procedure is illustrative of just one.

Figure 3A:
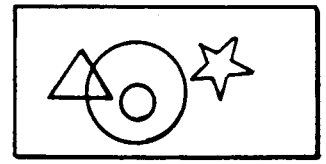
FIG. 3(a) illustrates a figure specification and FIGS. 3(b), 3(c), 3(d) and 3(e) illustrate possible map specifications corresponding to FIG. 3(a)
Figure 3B:
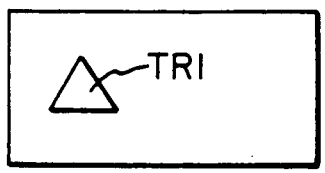
Figure 3C:
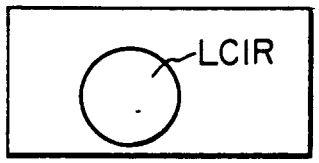
Figure 3D:
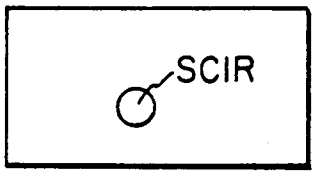
Figure 3E:
Figure 4:
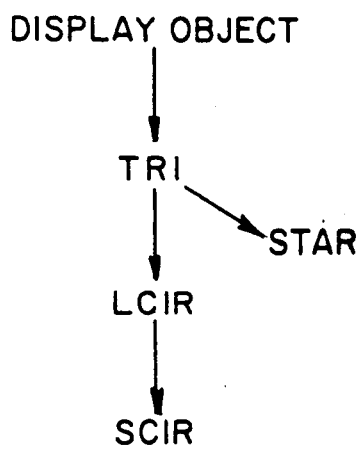
FIG. 4 illustrates the tree structure of the map specification.

The map specification of a display object comprises one or more bit mapped objects in a tag list or a tagged list tree. FIG. 3(a) shows the figure specification for a display object and FIGS. 3(b)-3(e) show the outlines of the map specifications associated with the same object and the tags therefor. The tree structure of the tagged tree list is shown in FIG. 4. The root of the tree is the region surrounding the entire display.

When a mouse event takes place, each display object in the contents list starting from the front is sent the message OnYou? with the x, y position of the mouse cursor. If a display object is found at the cursor position, the OnYou? message returns a list of itself and the part selected. Each bit map comprising a member of the map tree of the selected display object is sent the message OnYou? with the relative coordinates of the mouse cursor. The OnYou? messages are sent in a depth first search. In other words, if the coordinates of the OnYou? message fall within the small circle on the bit map shown as FIG. 3(d), the tag scir would be returned and the search ended. The selected display object is then sent the message RespondToSelection with the tag and button event (left, middle, right) and the x, y coordinates of the selected display object.

A RespondToSelection method attempts to match the tag and button event with a member of the list in the responsesToSelection IV. If it does, it sands the associated method to the selected display object.

Figure 5:
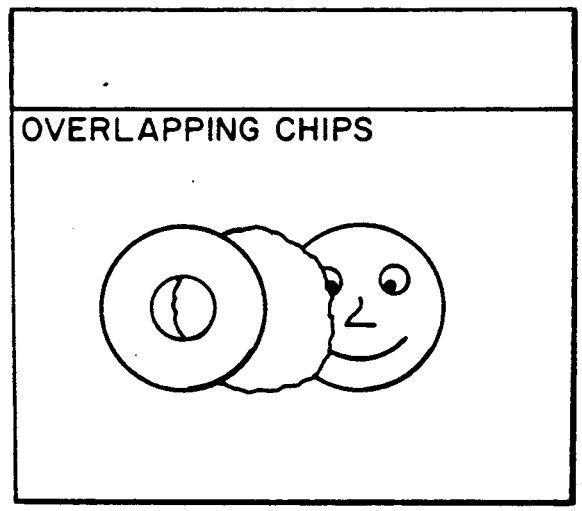
FIG. 5 illustrates three icons assembled upon a computer display illustrating the appearance of three dimensions.

As shown in FIG. 5, three display objects are positioned upon a window upon the screen. The display object of the class ChocolateChip looks like a chocolate chip cookie, the display object of the class FooChip looks like a man in the moon and the display object of the class WasherChip looks like a washer with a hole in the middle. The ChocolateChip is partially occluded by the WasherChip but can been seen through the hole in the WasherChip. Preferably, according to this invention, selection of these display objects with the mouse cursor exactly corresponds to their visual representation on the window. Selecting the part of the FooChip that is not occluded selects this display object. Selecting any part of the WasherChip's display object selects it. Selecting any part of the ChocolateChip that can be seen, including the part that is seen through the hole in the WasherChip, selects it. To implement this selection process, it is necessary that the map specification include in its tagged list a bit mapped specification identical or substantially identical to the mask specification bit map. When a mouse event takes place, if a true is not returned when the OnYou? is sent to the display object, the next display object on the contents list is polled with the OnYou? message.

Two additional user interface classes facilitate design of computer interfaces according to this invention. One called "Pointer" relates to mouse event inputs and another called "GroupPresentationObject" relates to management of a portion of the screen displaying multiple objects. The IVs and methods for these classes are described in Tables III and IV.

TABLE III

| POINTER | |
| --- | --- |
| Parents: | |
| Object | |
| IVs: | |
| xHot | the x coordinate of the hot spot |
| yHot | the y coordinate of the hot spot |
| imageBM | bit map of image |
| maskBM | bit map of mask |

TABLE III-continued
POINTER

| | | |
|---|---|---|
| button | | button pressed |
| Messages: | | |
| aPointer | ← Hide( ) | hides aPointer |
| aPointer | ← Show( ) | shows aPointer |
| aPointer | ← GetPosition(xHot, yHot) | gets position instance of IVs xHot to yHot |
| aPointer | ← SetPosition(xOrPos,y) | sets IVs xHot and yHot to xOrPos, y |
| aPointer | ← GetButtons( ) | gets buttons associated with aPointer |

TABLE IV
GroupedPresentationObject

Description:
An object that is composed of several graphics objects, bitmaps, and/or strings.
Parents:
Object
IVs:
objList    (pos1 presObjn . . . posn presObjn)
Messages:

| | | |
|---|---|---|
| aGPO | ← Paint(dspBM, x, y) | paints the image of aGPO onto the bitmap dspBM at x, y |
| aGPO | ← Replace(dspBM, x, y) | replaces the section of the bitmap dspBM at x, y with the image of aGPO |
| aGPO | ← Invert(dspBM, x, y) | inverts the image of aGPO and places it on the bitmap dspBM at x, y |
| aGPO | ← Erase(dspBM, x, y) | erases the image of aGPO on the bitmap dspBM at x, y |
| aGPO | ← GetWidth( ) | returns width of aGPO |
| aGPO | ← GetHeight( ) | returns height of aGPO |
| aGPO | ← AddObject(obj, xOrPos, y) | adds obj and position defined by xOrPos (if xOrPos is a position instance) or xOrPos, y to objList IV |
| aGPO | ← DeleteObject(obj) | deletes obj from objList IV |

TABLE IV-continued
GroupedPresentationObject

| | | |
|---|---|---|
| aGPO | ← Initialize(PosObjList) | sets objList IV to posObjList |

Interrupt driven functions maintain the current xHot, yHot and button IVs of an instance of Pointer. The current status of these IVs can be determined by sending a pointer object the messages GetPosition or GetButtons.

It should be apparent that the Drag method of a display object can be implemented as a series of moves with the new position for each move being supplied by the mouse similar to the move method.

When the Drag method is invoked, messages are repeatedly sent to a pointer object to determine the status of the button IV and the cursor position (the xHot and yHot IVs). If the status of the button IV indicates dragging is to continue, the display object is deleted from its present position and painted at the newly determined xHot, yHot position. When the button IV indicated that dragging is completed, the Drag method finishes with a "settle-in" procedure that updates OccludesMe and OccludedByMe lists and paints the object at its new location taking into consideration the occlusion priorities.

It should be apparent that an instance of GroupPresentationObject can very nicely manage the entire screen where the destination bit map, dspBM, is the screen bit map. The objList IV is then the "contents" list earlier referred to. This class enables the entire screen display to be treated as an object.

In addition to the user interface classes, special tool classes aid in the implementation of the systems and methods according to this invention. The DisplayObjectEditor class is generally described in the following Table V.

TABLE V
DisplayObjectEditor

Parents:
Window
IVs:

| | |
|---|---|
| dspObj | displayObject being edited |
| imagePlane | collection of graphic objects describing the image of the displayObject |
| shadowPlane | collection of graphic objects describing the opaque potion of the displayObject |
| mapPlane | collection of graphic objects describing the selectable regions of the displayObject |
| otherPlane | list of collections of graphic objects describing the selectable subregions of the displayObject |
| controlMenu | menu which allows user to select plant to edit |

Messages:

| | | |
|---|---|---|
| aDisEd | ← EditAppearance(dspObj, x, y) | edits appearance of dspObj at x, y |
| aDisEd | ← SelectElement( ) | selects element |

TABLE V-continued
DisplayObjectEditor aDisEd ← SelectPoint( ) selects point aDisEd ← SelectPlane( ) selects plane aDisEd ← AddLine( ) adds a line to aDisEd aDisEd ← AddRectangle( )
                adds a rectangle to aDisEd aDisEd ← AddPolygon( ) adds a polygon to aDisEd aDisEd ← AddCircle( ) adds a circle to aDisEd aDisEd ← AddCurve( ) add a curve to aDisEd aDisEd ← AddClosedCurve( )
                adds a closed curve to aDisEd aDisEd ← AddEllipse( ) adds an ellipse to aDisEd aDisEd ← Add Text( ) adds text to aDisEd aDisEd ← ChangeColor( ) changes color of selected object aDisEd ← ChangeDashing( )
                changes dashing of selected object aDisEd ← ChangeFillColor( )
                changes fill color of selected object aDisEd ← ChangeFillStyle( )
                changes fill style of selected object aDisEd ← ChangeFillPattern( )
                changes fill pattern of selected object aDisEd ← ChangeCharStyle( )
                changes character style of selected text aDisEd ← DeleteElement( )
                deletes element from aDisEd aDisEd ← AddPoint( ) deletes point from selected object aDisEd ← DeletePoint( ) deletes point from selected object aDisEd ← MovePoint( ) moves point of selected object aDisEd ← MoveElement( ) moves element in aDisEd aDisEd ← MoveToPlane( ) moves to plane

TABLE V-continued
DisplayObjectEditor aDisEd ← CopyElement( ) copies selected element aDisEd ← SaveDisplayObject( )
                saves display object aDisEd ← Exit( ) saves contents of aDisEd and quits aDisEd ← Quit( ) quits edit session without saving aDisEd ← DeletePlane(plane)
                deletes contents of plane; sets plane IV to nil aDisEd ← AddPlane(plane)
                adds contents of fromPlane into current plane aDisEd ← CopyPlane(fromPlane)
                copies contents of fromPlane into current plane aDisEd ← MovePlane(fromPlane)
                moves contents of fromPlane into current plane The Window class in the parents list of Table V is simply a subclass of displayObject. The methods of the displayObjectEditor that implement features of this invention are the MoveToPlane, MovePlane and CopyPlane methods. The MoveToPlane method allows an element to be transferred from one imaged specification to another. The CopyToPlane method allows a copy of an element on one image specification to be placed upon another. The MovePlane and CopyPlane methods are similar except that entire specifications are moved or copied. In the preferred implementation, the image specifications being moved or copied are lists of object graphic commands since these are much easier to manipulate and change. Eventually, the bit mapped version of the image specification must be stored in the figure, map and mask specifications.

The specific computer code for carrying out the various methods for the objects described in this application depends upon the computer language being used and the preferences of the programmer. The methods can all be written by normally skilled programmers given the descriptions provided herein. Attached to his specification as Appendix A is the description of certain objects and the code for the essential methods of those objects as this invention was implemented in the Interlisp-D/Loops environment.

As used in the following claims, the term "object-oriented environments" refers to a programming environment in which program code segments are considered objects that interact by sending messages to one another. "Objects" are combinations of data structures and methods. A portion of the data structure includes the "instance variables" that distinguish objects from similar objects of the same type. A "message" is a command to an object that causes the object to execute a method or send a message. A "method" (not used interchangeably with "process") is a subroutine used by an object upon receipt of a message.

A "task" or "program" is a series of instructions stored in a computers main or mass storage memory which can be executed by the computer.

A computer "display" is a two dimensional interactive output device such as a video screen. A "window" is all or a portion of the surface of the display.

"Interactive" editors as used in the claims refers to editors in which as editing takes place, the completed portions of the graphic element appear upon the display to be used as reference points for further editing.

```
(FILECREATED " 2-Oct-87 03:35:06" {PITTFS1:LRDC:PITT}<ONR>CHIPS>G>CHIPSDISPLAYOBJ.;36 previous date: "30-Sep-87 17:28:57" {PITTFS1:LRDC:PITT}<ONR>CHIPS>G>CHIPSDISPLAYOBJ.;35)

(* Copyright (c) 1987 by University of Pittsburgh. All rights reserved.)

(PRETTYCOMPRINT CHIPSDISPLAYOBJCOMS)

(RPAQQ CHIPSDISPLAYOBJCOMS ((CLASSES DisplayObject)
        (METHODS DisplayObject.Animate DisplayObject.AskTag DisplayObject.Copy
                 DisplayObject.DeleteFromSubstrate DisplayObject.Destroy DisplayObject.DestroyMap
                 DisplayObject.Display DisplayObject.DontSave DisplayObject.Draw
                 DisplayObject.EditDisplayRepresentation DisplayObject.Erase DisplayObject.Flash
                 DisplayObject.GetEditOptions DisplayObject.GetHeight DisplayObject.GetNextEvent
                 DisplayObject.GetPartAt DisplayObject.GetPhysicalConnectorPosition
                 DisplayObject.GetRegion DisplayObject.GetWidth DisplayObject.Initialize
                 DisplayObject.Move DisplayObject.NewDisplayEditor DisplayObject.OfferEditOptions
                 DisplayObject.OnYou? DisplayObject.PutPhysicalConnectorPosition
                 DisplayObject.ReplaceDisplayData DisplayObject.SetTag DisplayObject.SettleIn)
        (MACROS GetPictureOffset GetPictureSpecification GetPictureTag GetSubmaps)
        (FNS CheckDS&Pos DefInspectorFns DisplayObjectSpecifier.FETCHFN
             DisplayObjectSpecifier.PROPCOMMANDFN DisplayObjectSpecifier.PROPPRINTFN •
             DisplayObjectSpecifier.SELECTIONFN DisplayObjectSpecifier.STOREFN
             DisplayObjectSpecifier.TITLECOMMANDFN DisplayObjectSpecifier.VALUECOMMANDFN)))
(DEFCLASSES DisplayObject)
[DEFCLASS DisplayObject
    (MetaClass ChipMeta Edited:                              (* Captain.Zatar "27-Sep-87 16:54"))
    (Supers SelectionMixin DisplayObjectManager GraphicalRelationshipsMixin FileMixin UglyMixin)
    (InstanceVariables
(displayStream NIL doc                                       (* The display stream that this display object is
                                                                displayed on.)

Instances
            (Value))
(eventStream NIL Instances (Value)
            doc                                              (* The eventStream that this display object "listens"
                                                                to to receive user input.)
            )
(figure NIL tagList ((NIL NIL))
        Instances
        (Value tagList)
        commands
        (("Display picture" DisplayPicture
             "Display this picture in the background to make comparing and aligning pictures easier.")
          ("Edit picture" EditPicture "Bring this picture into the editor window for editing."))
        doc                                                  (* An instance of PictureSpecification which describes
                                                                how to display this display object on the screen.)
        )
(mask NIL tagList ((NIL NIL))
      Instances
      (Value tagList)
      commands
      (("Display picture" DisplayPicture
             "Display this picture in the background to make comparing and aligning pictures easier.")
        ("Edit picture" EditPicture "Bring this picture into the editor window for editing."))
      doc                                                    (* An instance of PictureSpecification which describes
                                                                the non-opaque parts of the display object)
      )
(map (map NIL)
     tagList
     ((NIL (map NIL)))
     Instances
     (Value tagList)
     commands
     (("Display picture" DisplayPicture
             "Display this picture in the background to make comparing and aligning pictures easier.")
        ("Edit picture" EditPicture "Bring this picture into the editor window for editing.")
        ("Subdivide picture" SubdividePicture
                        "Create a new picture that indicates a subregion of the map.")
        ("Label position" LabelPosition "Name a point on this map."))
```

```
                ("Delete Picture" DeletePicture "Delete this picture (do not delete the map).")))
(host NIL doc                                                           (* What substrate instance am I contained in?)
    )
(position NIL doc                                                       (* The position on displayStream where this display
                                                                         object is to be displayed.))

(tag default tagList (default))
(object NIL doc                                                         (* What object does this display object represent?)
    )
(editor NIL doc                                                         (* Caches the editor for this display object.)
        DontSave
        (Value))
(responsesToSelection ((map LEFT Animate)
                       (map MIDDLE OfferEditOptions))
                    doc (* A list of elements: (tag button selector) for associating messages with (tag button) pairs.
             (Use macros GetResponseTag GetResponseButton and GetResponseSelector to access them.) (Note: if selector is not an
             atom, it will be evaluated with self Position and Button bound. See DisplayObject.RespondToSelection))

copyDown T)
(physicalConnectors NIL doc (* An alist of map tag and position that specifies positions for parts of the display object that may be used by
             display objects to line themselves up reflecting physical attachment.)

tagList NIL))]

(← (S DisplayObject) OldInstance)

[METH DisplayObject Animate (eventStream displayStream)
    (* * Move the view around the screen in response to the coordinates specified by eventStream.)]

[METH DisplayObject AskTag NIL
    (* * Prompt with a menu of tags.)]

[METH DisplayObject Copy (name copyFigure? markAsChanged?)
    (* * Copy an instance of DisplayObject. Copies lists, atoms, and makes copies of instances
        stored at any level.)]

[METH DisplayObject DeleteFromSubstrate NIL
    (* * Delete this chip from its host.)]

[METH DisplayObject Destroy NIL
    (* * Don't forget to wave bye bye to any other objects you are associated with.)]

[METH DisplayObject DestroyMap (don'tAsk?)
    (* * Destroy all the picture specifications in map and set map iv to its default value.)]

[METH DisplayObject Display (stream position)
    (* * Display this view on its display stream at its position. Done by double buffering.
        Displays all views overlapping it and itself in one blast by first displaying them on a
        scratch bitmap and the blitting the whole mess to the screen.)]

[METH DisplayObject DontSave NIL
    (* * Don't save my figure mask or map either.)]

[METH DisplayObject Draw (stream position clippingRegion)
    (* * Display this display object on its display stream.)]

[METH DisplayObject EditDisplayRepresentation (domObjClass)
    (* * Edit the display representation of this display object.)]

[METH DisplayObject Erase (stream position)
    (* * Erase this view from its display.)]
```

[METH DisplayObject Flash (stream position)
    (* * Blink a chip.)]

[METH DisplayObject GetEditOptions (POSITION BUTTON)
    (* * Temporary method until I figure out what I really want here.)]

[METH DisplayObject GetHeight NIL
    (* * Return the maximum height of the figure and mask PictureSpecifications. Note: the map is
        not included because I believe it would be unintuitive and for animation purposes, the width
        of the map is irrelevant.-jdc)]

[METH DisplayObject GetNextEvent (eventStream x y)
    (* New method template)]

[METH DisplayObject GetPartAt (posOrX y)
    (* * Map (x y)
        onto some part of this chip. Return the method associated with ButtonType or the name if no
        ButtonType is specified.)]

[METH DisplayObject GetPhysicalConnectorPosition (physicalConnector)
    (* * Get the end point position for a connector.)]

[METH DisplayObject GetRegion NIL
    (* * Returns the region of its display stream that is occupied by this views figure.)]

[METH DisplayObject GetWidth NIL
    (* * Return the maximum width of the figure and mask PictureSpecifications. Note: the map is
        not included because I believe it would be unintuitive and for animation purposes, the width
        of the map is irrelevant.-jdc)]

[METH DisplayObject Initialize (host object x y dontDisplay?)
    (* * Initialize a display object to be displayed in the substrate host.)]

[METH DisplayObject Move (eventStream)
    (* Move a display object to a new location.)]

[METH DisplayObject NewDisplayEditor NIL
    (* * Just in case they want to specialize DisplayObject to use a different kind of
        DisplayEditor...)]

[METH DisplayObject OfferEditOptions (Position Button)
    (* * Temporary method until I figure out how I really want to do this.)]

[METH DisplayObject OnYou? (x y)
    (* * Is (x y)
        on me? If so, then return self else return NIL.)]

[METH DisplayObject PutPhysicalConnectorPosition (physicalConnector position)
    (* * Store a physical connector position in the physical connection association list of this
        display object.)]

[METH DisplayObject ReplaceDisplayData (figureData maskData mapData physicalConnectorsData SKW)
    (* * Create new picture specification instances and stick the data in em.)]

[METH DisplayObject SetTag (newTag)
    (* * Swap the picture specifications in from the tagList.)]

[METH DisplayObject SettleIn (landingPlace window newScreenXPos newScreenYPos origPos)

(* * DisplayObject settles in to the new position.)]

(DEFINEQ (DisplayObject.Animate
  (Method ((DisplayObject Animate)
          self eventStream displayStream)              (* Bob&John "30-Sep-87 13:14")

(* * Move the view around the screen in response to the coordinates specified by eventStream.)

(OR eventStream (SETQ eventStream ($ Mouse)))
          (OR displayStream (SETQ displayStream (SCREENBITMAP)))
          (← self PrepareToMove)
          (LET ((origPos (@ position))
                (figure (← (@ figure)
                          GetBitmap))
                (mask (← (@ mask)
                        GetBitmap))
                (width (← self GetWidth))
                (height (← self GetHeight))
                newPos newWindow landingPlace)
            (BITBLT scratchBitmap NIL NIL scratchBitmap2 NIL NIL width height)
            (← eventStream SetPosition (ConvertWindowToScreenCoords (@ displayStream)
                                                                    (@ position)))
            (SETQ newPos (AnimateObj self figure (X (@ figure:offset))
                                                (Y (@ figure:offset))
                                                mask
                                                (X (@ mask:offset))
                                                (Y (@ mask:offset))
                                                scratchBitmap2 eventStream displayStream width height))
            (SETQ window (WHICHW (fetch (POSITION XCOORD) of newPos)
                                 (fetch (POSITION YCOORD) of newPos)))
            (if window
                then (SETQ landingPlace (SubstrateFromWindow window)))
            (← self SettleIn landingPlace window (fetch (POSITION XCOORD) of newPos)
                (fetch (POSITION YCOORD) of newPos)
                origPos))))

(DisplayObject.AskTag
  [Method ((DisplayObject AskTag)
          self)                                        (* Bob&John "29-Sep-87 01:05")

(* * Prompt with a menu of tags.)

(LET [(newTag (AskFromMenu (GetValue self (QUOTE tag)
                                              (QUOTE tagList]
            (if (AND newTag (NEQ newTag (@ tag)))
                then (← self SetTag newTag)])

(DisplayObject.Copy
  (Method ((DisplayObject Copy)
          self name copyFigure? markAsChanged?)        (* Bob&John "25-Sep-. 01 ")

(* * Copy an instance of DisplayObject. Copies lists, atoms, and makes copies of instances stored o. iny level.)

(LET ((newInst (CopyInstance self)))
            (if name
                then (← newInst SetName name))
            (←@
              newInst figure (← (@ figure)
                                Copy NIL copyFigure? NIL markAsChanged?))
            (←@
              newInst mask (← (@ mask)
                              Copy NIL NIL NIL markAsChanged?))
            (←@
              newInst map (SubstituteCopiesForMapElements (@ map)))
            (if (NOT markAsChanged?)
                then (UNMARKASCHANGED name (QUOTE INSTANCE)))
            newInst)))

(DisplayObject.DeleteFromSubstrate
```
  [Method ((DisplayObject DeleteFromSubstrate)
          self)                                        (* Bob&John "24-Sep-87 19:02")

(* * Delete this chip from its host.)

(if (@ host)
            then (← self PrepareToMove)
                 (← ($! (@ host))
                       RemoveDisplayObject self))
        (if ($! (@ object))
            then (←@
                   (@ object)
                   displayObjects
                   (REMOVE self (@ (@ object)
                                      displayObjects])
```

(DisplayObject.Destroy
```
   (Method ((DisplayObject Destroy)
           self)                                       (* Bob&John "18-Sep-87 18:30")

(* * Don't forget to wave bye bye to any other objects you are associated with.)

(if (@ host)
            then (← self DeleteFromSubstrate))
        (←Super
          self Destroy)))
```

(DisplayObject.DestroyMap
```
   [Method ((DisplayObject DestroyMap)
           self don'tAsk?)                             (* Bob&John "21-Aug-87 14:35")

(* * Destroy all the picture specifications in map and set map iv to its default value.)

(if (NOT don'tAsk?)
            then (HELPCHECK "About to destroy all the picture specification in map for " self
                            "Type OK to proceed; ↑ to abort."))
        (DestroyMap (@ map))
        (←@
          map
          (GetIt (Class self)
                 (QUOTE map])
```

(DisplayObject.Display
```
   [Method ((DisplayObject Display)
           self stream position)                       (* Bob&John "28-Aug-87 22:15")

(* * Display this view on its display stream at its position. Done by double buffering. Displays all views
overlapping it and itself in one blast by first displaying them on a scratch bitmap and the blitting the whole mess
to the screen.)

(SETQ stream (OR stream (@ displayStream)))
        (SETQ position (OR position (@ position)))
        (CheckDS&Pos self stream position)
        (LET* ((viewRegion (← self GetRegion))
               (width (fetch (REGION WIDTH) of viewRegion))
               (height (fetch (REGION HEIGHT) of viewRegion))
               (x (fetch (POSITION XCOORD) of position))
               (y (fetch (POSITION YCOORD) of position)))
              (← self DrawUnder scratchBitmap)
              (← (@ mask)
                  Draw scratchBitmap (QUOTE (0 . 0))
                  (QUOTE ERASE))
              (← (@ figure)
                  Draw scratchBitmap (QUOTE (0 . 0))
                  (QUOTE PAINT))
              (BITBLT scratchBitmap 0 0 stream x y width height (QUOTE INPUT)
                      (QUOTE REPLACE])
```

(DisplayObject.DontSave

```
[Method ((DisplayObject DontSave)
        self)                                              (* Bob&John "28-Aug-87 22:49")

(* * Don't save my figure mask or map either )

(←Super)
        (if ($! (@ figure))
            then (← (@ figure)
                    DontSave))
        (if ($! (@ mask))
            then (← (@ mask)
                    DontSave))

(* * This is more general that it needs to be.)

(MapNLISTP (@ map)
                    (FUNCTION (LAMBDA (x)
                            (if ($! x)
                                then (← x DontSave])

(DisplayObject.Draw
    (Method ((DisplayObject Draw)
            self stream position clippingRegion)           (* Bob&John "28-Aug-87 22:15")

(* * Display this display object on its display stream.)

(SETQ stream (OR stream (@ displayStream)))
        (SETQ position (OR position (@ position)))
        (CheckDS&Pos self stream position)
        (← (@ mask)
            Draw stream position (QUOTE ERASE)
            clippingRegion)
        (← (@ figure)
            Draw stream position (QUOTE PAINT)
            clippingRegion)))

(DisplayObject.EditDisplayRepresentation
    (Method ((DisplayObject EditDisplayRepresentation)
            self domObjClass)                              (* Bob&John "30-Sep-87 13:40")

(* * Edit the display representation of this display object.)

(EditWhen OPEN DisplayObject.EditDisplayRepresentation)
        (if (NOT (AND (@ editor)
                    (← (@ editor)
                        Open)))
            then (←@
                    editor
                    (← self NewDisplayEditor))
                (DoSavingOption self (QUOTE When% Edited))
                (← (@ editor)
                    EditDisplayRepresentation
                    [LIST (LIST (QUOTE figure)
                                (GetValue self (QUOTE figure)
                                    (QUOTE tagList))
                                (GetValue self (QUOTE figure)
                                    (QUOTE commands)))
                          (LIST (QUOTE mask)
                                (GetValue self (QUOTE mask)
                                    (QUOTE tagList))
                                (GetValue self (QUOTE mask)
                                    (QUOTE commands)))
                          (LIST (QUOTE map)
                                (GetValue self (QUOTE map)
                                    (QUOTE tagList))
                                (GetValue self (QUOTE map)
                                    (QUOTE commands]
                    self domObjClass))))

(DisplayObject.Erase
```

```
(Method ((DisplayObject Erase)                        (* Bob&John "21-Aug-87 14:35")
        self stream position)

(* * Erase this view from its display.)

(SETQ stream (OR stream (@ displayStream)))
  (SETQ position (OR position (@ position)))
  (← self DrawUnder scratchBitmap)
  (BITBLT scratchBitmap 0 0 stream (fetch (POSITION XCOORD) of position)
          (fetch (POSITION YCOORD) of position)
          (← self GetWidth)
          (← self GetHeight)
          (QUOTE INPUT)
          (QUOTE REPLACE))))

(DisplayObject.Flash
  (Method ((DisplayObject Flash)                      (* Bob&John "21-Aug-87 14:35")
          self stream position)

(* * Blink a chip.)

(SETQ stream (OR stream (@ displayStream)))
    (SETQ position (OR position (@ position)))
    (← (@ mask)
       Draw stream position (QUOTE INVERT))
    (DISMISS 500)
    (← (@ mask)
       Draw stream position (QUOTE INVERT))))

(DisplayObject.GetEditOptions
  [Method ((DisplayObject GetEditOptions)             (* Bob&John "24-Sep-87 21:51")
          self POSITION BUTTON)

(* * Temporary method until I figure out what I really want here.)

(QUOTE (("Delete from Substrate" (← self DeleteFromSubstrate)
             "Delete this display object from its substrate.")
            ("Move to a specific position" [LET* [(xPos (RNUMBER "Enter X Coordinate" NIL
                                                                 NIL NIL T))
                                                  (yPos (if xPos
                                                            then (RNUMBER
                                                                   "Enter Y Coordinate"
                                                                   NIL NIL NIL T]
                                           (if yPos
                                               then (← self Move (CONS xPos yPos]
             "Move this display object to a specific position.")
            ("Drag Display Object" (← self Move ($ Mouse))
             "Drag the display object around the screen following the cursor.")
            ("Inspect Display Object" (PROGN (DoSavingOption self (QUOTE When% Edited))
                                             (INSPECT self))
             "Invoke the Interlisp-D inspector on this display object instance.")
            ("Edit Display Representation" (← self EditDisplayRepresentation
                                               (Class (@ object)))
             "Edit the way this display object looks.")
            ("Edit Response to Selection" (PROGN (DoSavingOption self (QUOTE
                                                                        When% Edited))
                                                 (EDITE (@ responsesToSelection)))
             "Edit the map that describes what to do when this display object is selected.")
            ("Switch Tag" (← self AskTag)
             "Examine or change the state of this chip.")
            ("Name Display Object" (← self SetName (← (@ host)
                                                      AskAtom "Enter name > "))
             "Name the selected display object.")
            ("Send Message to Display Object" (LET ((messageName (← (@ host)
                                                                    AskAtom
                                                                    "Enter message name > ")))
                                                (if messageName
```

```
                                                       then (←!
                                                              self messageName)))

"Type in a message name to be sent to this display object.")
              ("Make Method Menu for Display Object" (if (← (Class self)
                                                           List
                                                           (QUOTE Methods))
                                                       then (MOVEW (MakeMethodMenu
                                                                     (← self Class)))
                                                       else (← (@ host)
                                                               Say
                                                               "This class has no methods associated with it."))
                                                   "Create a menu for editing methods."])
```

(DisplayObject.GetHeight
  (Method ((DisplayObject GetHeight)
           self)                                       (* Bob&John "21-Aug-87 14:35")

(* * Return the maximum height of the figure and mask PictureSpecifications. Note: the map is not included because I believe it would be unintuitive and for animation purposes, the width of the map is irrelevant.-jdc)

```
           (MAX (← (@ figure)
                   GetHeight)
                (← (@ mask)
                   GetHeight))))
```

(DisplayObject.GetNextEvent
  (Method ((DisplayObject GetNextEvent)
           self eventStream x y)                       (* Bob&John "29-Sep-87 01:06")

(* * Poll the event stream until something happens.)

```
           (do (← eventStream GetNextEvent) repeatuntil (OR (← eventStream GetButton)
                                                             (← eventStream NewPosition? x y))
               )
           (NOT (@ eventStream button))))
```

(DisplayObject.GetPartAt
  [Method ((DisplayObject GetPartAt)
           self posOrX y)                              (* Bob&John "21-Aug-87 14:35")

(* * Map (x y) onto some part of this chip. Return the name of a part; return the atom map if no subpart is at the given coordinates.)

```
           (if (POSITIONP posOrX)
               then (SETQ y (Y posOrX))
                    (SETQ posOrX (X posOrX)))
           (if (NOT (AND (NUMBERP posOrX)
                          (NUMBERP y)))
               then (QUOTE map)
               else (LET ((pos (@ position)))
                         (InterpretMap (@ map)
                                       (DIFFERENCE posOrX (X pos))
                                       (DIFFERENCE y (Y pos]
```

(DisplayObject.GetPhysicalConnectorPosition
  [Method ((DisplayObject GetPhysicalConnectorPosition)
           self physicalConnector)                     (* Bob&John "24-Sep-87 15:12")

(* * Get the end point position for a connector.)

```
           (OR (CADR (SASSOC physicalConnector (@ physicalConnectors)))
               (ERROR (CONCAT "The physical connector " physicalConnector
                              " has no position specified for it."])
```

(DisplayObject.GetRegion
  (Method ((DisplayObject GetRegion)
           self)                                       (* Bob&John "21-Aug-87 14:35")

(* * Returns the region of its display stream that is occupied by this views figure.)

```
                (CREATEREGION (fetch (POSITION XCOORD) of (@ position))
                              (fetch (POSITION YCOORD) of (@ position))
                              (← self GetWidth)
                              (← self GetHeight))))
```

(DisplayObject.GetWidth
    (Method ((DisplayObject GetWidth)
             self)                                          (* Bob&John "21-Aug-87 14:35")

(* * Return the maximum width of the figure and mask PictureSpecifications. Note: the map is not included because I
        believe it would be unintuitive and for animation purposes, the width of the map is irrelevant.-jdc)

(MAX (← (@ figure)
                GetWidth)
             (← (@ mask)
                GetWidth))))

(DisplayObject.Initialize
    (Method ((DisplayObject Initialize)
             self host object x y dontDisplay?)             (* Bob&John "24-Sep-87 21:38")

(* * Initialize a display object to be displayed in the substrate host.)

(←@
          host host)
        (←@
          object object)
        (←@
          editor NIL)
        (←@
          displayStream
          (@ (S! host)
             window))
        (←@
          responsesToSelection
          (COPY (@ responsesToSelection)))
        (if (AND (NUMBERP x)
                 (NUMBERP y))
            then (←@
                   position
                   (CREATEPOSITION x y)))
        (← host AddInFront self T)
        (if (AND (NOT dontDisplay?)
                 (@ displayStream))
            then (← self InformThoseILandedOn)
                 (← self Display))
        (DoSavingOption self (QUOTE When% Created))
        self))

(DisplayObject.Move
    (Method ((DisplayObject Move)
             self eventStream)                              (* edited: "1-Oct-87 21:18")
                                                            (* Move a display object to a new location.)

(EditWhen OPEN DisplayObject.Move)
        (if (POSITIONP eventStream)
            then (← self PrepareToMove)
                 (←@
                   position eventStream)
                 (← self InformThoseILandedOn)
                 (← (@ host)
                    AddInFront self)
                 (← self Display)
          elseif (EventStreamP eventStream)
            then (← self Animate eventStream))))

(DisplayObject.NewDisplayEditor
    (Method ((DisplayObject NewDisplayEditor)
             self)                                          (* Bob&John "14-Sep-87 22:28")

(* * Just in case they want to specialize DisplayObject to use a different kind of DisplayEditor...)

```
        (← (S DisplayEditor)
            New)))

(DisplayObject.OfferEditOptions
  [Method ((DisplayObject OfferEditOptions)
           self Position Button)                            (* Bob&John "21-Aug-87 14:35")

(* * Temporary method until I figure out how I really want to do this.)

(AskFromMenu (APPEND (← self GetEditOptions)
                           (QUOTE ((" " " " "This space intentionally left blank.")))
                    (if (FMEMB (QUOTE GetEditOptions)
                               (← (Class (@ object))
                                  List!
                                  (QUOTE Methods)))
                        then (← (@ object)
                                GetEditOptions])

(DisplayObject.OnYou?
  [Method ((DisplayObject OnYou?)
           self x y)                                        (* Bob&John " 7-Sep-87 01:23")

(* * Is (x y) on me? If so, then return self else return NIL.)

(LET ((pos (@ position)))
            (AND (POSITIONP pos)
                 (← (CADR (@ map))
                    OnYou?
                    (DIFFERENCE x (fetch (POSITION XCOORD) of pos))
                    (DIFFERENCE y (fetch (POSITION YCOORD) of pos)))
                 self))))

(DisplayObject.PutPhysicalConnectorPosition
  [Method ((DisplayObject PutPhysicalConnectorPosition)
           self physicalConnector position)                 (* Bob&John "24-Sep-87 15:12")

(* * Store a physical connector position in the physical connection association list of this display object.)

(if (SASSOC physicalConnector (@ physicalConnectors))
           then (PUTASSOC physicalConnector (LIST position)
                          (@ physicalConnectors))
           else (ERROR (CONCAT "There is no physical connector " physicalConnector
                               " specified for the display object "
                               (GetObjectName self])

(DisplayObject.ReplaceDisplayData
  [Method ((DisplayObject ReplaceDisplayData)
           self figureData maskData mapData physicalConnectorsData SKW)
                                                            (* Bob&John "24-Sep-87 14:11")

(* * Create new picture specification instances and stick the data in em.)

(EditWhen OPEN DisplayObject.ReplaceDisplayData)
       (PutValue self (QUOTE tag)
                 (for tagData in figureData collect (CAR tagData))
                 (QUOTE tagList))
       [if [NOT (FMEMB (@ tag)
                       (GetValue self (QUOTE tag)
                                 (QUOTE tagList]
           then (←@
                  tag
                  (CAR (GetValue self (QUOTE tag)
                                 (QUOTE tagList]
       (PutValue self (QUOTE figure)
                 (for tagData in figureData collect (LIST (CAR tagData)
                                                          (CopyPicSpecOnWrite
                                                            (CAADR tagData)
                                                            (CADADR tagData)
```

```
                                - (QUOTE tagList))
        [←@
          figure
           (CADR (SASSOC (@ tag)
                         (GetValue self (QUOTE figure)
                                   (QUOTE tagList]
       (PutValue self (QUOTE mask)
                 (for tagData in maskData collect (LIST (CAR tagData)
                                                        (CopyPicSpecOnWrite
                                                          (CAADR tagData)
                                                          (CADADR tagData)
                                                          (CADDR (CADR tagData))
                                                          SKW)))
                (QUOTE tagList))
        [←@
          mask
           (CADR (SASSOC (@ tag)
                         (GetValue self (QUOTE mask)
                                   (QUOTE tagList]
       (PutValue self (QUOTE map)
                 (for tagData in mapData collect (LIST (CAR tagData)
                                                       (CopyMapOnWrite (CADR tagData)
                                                                       (CADDR
                                                                         tagData)
                                                                       SKW)))
                (QUOTE tagList))
        [←@
          map
           (CADR (SASSOC (@ tag)
                         (GetValue self (QUOTE map)
                                   (QUOTE tagList]
       (PutValue self (QUOTE physicalConnectors)
                 physicalConnectorsData
                 (QUOTE tagList))
        (←@
          physicalConnectors
           (CADR (SASSOC (@ tag)
                         (GetValue self (QUOTE physicalConnectors)
                                   (QUOTE tagList])

(DisplayObject.SetTag
  [Method ((DisplayObject SetTag)
           self newTag)                               (* Bob&John "29-Sep-87 01:07")

(* * Swap the picture specifications in from the tagList.)

(if (NOT (EQ newTag (@ tag)))
        then (if (FMEMB newTag (GetValue self (QUOTE tag)
                                         (QUOTE tagList)))
                 then (← self Erase)
                      (←@
                        tag newTag)
                      [for x in (QUOTE (figure mask map physicalConnectors))
                         do (if (SASSOC newTag (GetValue self x (QUOTE tagList)))
                                then (PutValue self x
                                               (CADR (SASSOC newTag
                                                             (GetValue
                                                               self x
                                                               (QUOTE tagList]
                      (← self Display)
                 else (← (@ host)
                         Say
                         (CONCAT "Sorry, there is no tag called " newTag
                                 " defined for this display object."])

(DisplayObject.SettleIn
  (Method ((DisplayObject SettleIn)
           self landingPlace window newScreenXPos newScreenYPos origPos)
                                                     (* Bob&John "25-Sep-87 00:52")

(* * DisplayObject settles in to the new position.)
```

```
              [if (NOT landingPlace)
                 then (←@
                        position origPos)
                 else (LET ((landingPlaceRegion (InteriorWindowRegion window)))
                           [←@
                             position
                              (SubtractPositions (CREATEPOSITION newScreenXPos newScreenYPos)
                                                 (CREATEPOSITION (fetch (REGION LEFT) of
                                                                                landingPlaceRegion)
                                                                 (fetch (REGION BOTTOM)
                                                                        of landingPlaceRegion]
                              (if (NEQ landingPlace (@ host))
                                  then (← (@ host)
                                          RemoveDisplayObject self)
                                       (←@
                                         host landingPlace)
                                       (←@
                                         displayStream window]
              (← (@ host)
                 AddInfront self T)
              (← self InformThoseILandedOn)
              (← self Display)))
)
(DECLARE: EVAL@COMPILE
(DEFMACRO GetPictureOffset (x)
          (BQUOTE (CADDR , x)))
(DEFMACRO GetPictureSpecification (x)
          (BQUOTE (CAR , x)))
(DEFMACRO GetPictureTag (x)
          (BQUOTE (CADR , x)))
(DEFMACRO GetSubmaps (x)
          (BQUOTE (CADDDR , x)))
)
(DEFINEQ (CheckDS&Pos
  [LAMBDA (self stream position)                              (* Bob&John "29-Sep-87 18:12")

(* * Make sure that the position and displayStream IVs of a display object are set to appropriate values.
If not do the HELPCHECK and offer the folks the opportunity to set them appropriately.)

(if [NOT (AND (POSITIONP position)
                  (OR (STREAMP stream)
                      (BITMAPP stream)
                      (WINDOWP stream]
        then (if (HELPCHECK self "Both position and stream must be defined."
                            (CHARACTER (CHARCODE CR))
                            "Type OK to enter position and stream.")
                 then (←@
                        displayStream
                        (WHICHW (GETPOSITION)))
                      (←@
                        position
                        (CURSORPOSITION NIL (@ displayStream])

(DefInspectorFns
  [LAMBDA NIL                                                 (* Bob&John "29-Sep-87 18:14")

(* * Set up a Window Editor with the appropriate functions.)

(for x in (QUOTE (FETCHFN STOREFN PROPCOMMANDFN VALUECOMMANDFN TITLECOMMANDFN SELECTIONFN
                              PROPPRINTFN))
         as y in (QUOTE (WEdit.FETCHFN WEdit.STOREFN WEdit.PROPCOMMANDFN WEdit.VALUECOMMANDFN
                                       WEdit.TITLECOMMANDFN NULL NULL))
         join (DEFINE (LIST (LIST (PACK* (QUOTE DisplayObjectSpecifier.)
                                         x)
                                  (LIST (QUOTE LAMBDA)
                                        (SUBST (QUOTE datum)
                                               (QUOTE windowDescription)
                                               (ARGLIST y))
```

```
                                                  (LIST (QUOTE EditWhen)
                                                        (QUOTE (QUOTE OPEN))
                                                        (PACK* (QUOTE DisplayObjectSpecifier.)
                                                               x])
```

(DisplayObjectSpecifier.FETCHFN
```
   [LAMBDA (datum prop)                                          (* Bob&John "29-Sep-87 18:15")
```

(* * *Get the value of an inspector field. Used by the display object specifier.*)

```
      (EditWhen OPEN DisplayObjectSpecifier.FETCHFN)
      (CADR (ASSOC prop datum])
```

(DisplayObjectSpecifier.PROPCOMMANDFN
```
   [LAMBDA (prop obj inspectorWindow)                            (* Bob&John "29-Sep-87 18:15")
```

(* * *Asks the user to enter a new value for the prop field of the Display Object Specifier inspector.*)

```
      (EditWhen OPEN DisplayObjectSpecifier.PROPCOMMANDFN)
      (ERSETQ (PROG ((oldValue (DisplayObjectSpecifier.FETCHFN (WINDOWPROP inspectorWindow
                                                                          (QUOTE DATUM))
                                                                prop))
                     newValue promptWindow)
                    (TTYDISPLAYSTREAM (SETQ promptWindow (GETPROMPTWINDOW inspectorWindow 3)))
                    (CLEARBUF T T)
                    (RESETLST (RESETSAVE (TTY.PROCESS (THIS.PROCESS)))
                              (RESETSAVE (PRINTLEVEL 4 3))
                              (printout T T .PARA 0 0 (QUOTE (Type in value for))
                                    , .PPV prop "(NIL to abort). >")
                              (SETQ newValue (LISPXREAD T T))
                              (CLEARBUF T T)
                              (CLOSEW promptWindow))
                    (if newValue
                        then (INSPECTW.REPLACE inspectorWindow prop newValue])
```

(DisplayObjectSpecifier.PROPPRINTFN
```
   [LAMBDA (prop datum)                                          (* Bob&John "29-Sep-87 18:16")
```

(* * *Geez, I don't know. This doesn't look quite finished.*)

```
      [PLAYTUNE (QUOTE ((100 . 1000)
                        (2000 . 1000]
      (PROMPT "Fix up DisplayObjectSpecifier.PROPPRINTFN.")
      (EditWhen OPEN DisplayObjectSpecifier.PROPPRINTFN)
      (PRIN1 X NIL])
```

(DisplayObjectSpecifier.SELECTIONFN
```
   [LAMBDA (X)                                                   (* Bob&John "29-Sep-87 18:16")
```

(* * *Uh-huh!*)

```
      (EditWhen OPEN DisplayObjectSpecifier.SELECTIONFN])
```

(DisplayObjectSpecifier.STOREFN
```
   [LAMBDA (obj prop newVal)                                     (* Bob&John "29-Sep-87 18:17")
```

(* * *Set the value of a property in the Display Object Specifier.*)

```
      (EditWhen OPEN DisplayObjectSpecifier.STOREFN)
      (PUTASSOC prop (CONS newVal)
                obj])
```

(DisplayObjectSpecifier.TITLECOMMANDFN
```
   [LAMBDA (inspectorWindow datum)                               (* Bob&John "29-Sep-87 18:19")
```

(* * *What gets called when the title bar of a Display Object Specifier is selected. Puts up a menu of options, one of which is "Install". If it is selected, a display object is created conforming to the specifications of the specifier and installed in the domain object class that created this Specifier.*)

```
(EditWhen OPEN DisplayObjectSpecifier.TITLECOMMANDFN)
(AskFromMenu (QUOTE ((Install [PROG (class newDspObj)
                    [SETQ class ($! (WINDOWPROP inspectorWindow
                                                (QUOTE Class]
                    (if (ASSOC (CADR (ASSOC (QUOTE Tag)
                                            datum))
                               (GetClassIVHere class (QUOTE
                                                displayObjects)))
                        then (printout (GETPROMPTWINDOW inspectorWindow 3)
                                        T T .PPV "The tag "
                                        (CADR (ASSOC (QUOTE Tag)
                                                     datum))
                                        . " already exists!" T
                                        "Nothing installed.")
                             [PLAYTUNE (QUOTE ((30 . 10000]
                             (RETURN))
                    (SETQ newDspObj
                          (← ($! (CADR (ASSOC (QUOTE Class)
                                              datum)))
                             New))
                    (←@
                      newDspObj figure
                      (← ($! (CADR (ASSOC (QUOTE figure)
                                          datum)))
                         New))
                    (PutValue newDspObj (QUOTE figure)
                              (LIST (LIST (QUOTE default)
                                          (@ newDspObj figure)))
                              (QUOTE tagList))
                    (←@
                      newDspObj mask
                      (← ($! (CADR (ASSOC (QUOTE mask)
                                          datum)))
                         New))
                    (PutValue newDspObj (QUOTE mask)
                              (LIST (LIST (QUOTE default)
                                          (@ newDspObj mask)))
                              (QUOTE tagList))
                    (←@
                      newDspObj map
                      (LIST (QUOTE map)
                            (← ($! (CADR (ASSOC (QUOTE map)
                                                datum)))
                               New)))
                    (PutValue newDspObj (QUOTE map)
                              (LIST (LIST (QUOTE default)
                                          (@ newDspObj map)))
                              (QUOTE tagList))
                    (←@
                      newDspObj responsesToSelection (COPY (@ newDspObj
                                                responsesToSelection)))
                    (←@
                      newDspObj object class)
                    (DoSavingOption newDspObj (QUOTE When% Created))
                    [if (FMEMB (QUOTE displayObjects)
                               (← class List (QUOTE IVs)))
                        then
                         (PutClassIV
                           class
                           (QUOTE displayObjects)
                           (NCONC1 (GetClassIVHere class (QUOTE
                                                        displayObjects))
                                   (LIST (CADR (ASSOC (QUOTE Tag)
                                                      datum))
                                         newDspObj)))
                         (if [NOT (MEMB (QUOTE displayObjects)
                                        (GetClassIVHere class
                                                        (QUOTE
                                                         displayObjects)
                                                        (QUOTE
                                                         Instances]
                             then (PutClassIV class (QUOTE
```

```
                                                           displayObjects)
                                                      (NCONC1
                                                        (GetClassIVHere
                                                          class
                                                          (QUOTE displayObjects)
                                                          (QUOTE Instances))
                                                        (QUOTE displayObjects))
                                                      (QUOTE Instances)))
                                  else (← class AddIV (QUOTE displayObjects)
                                                (LIST (LIST (CADR
                                                              (ASSOC (QUOTE Tag)
                                                                     datum))
                                                            newDspObj))
                                        (QUOTE (Instances (displayObjects)
                                                          doc
                                        (* IV added by CHIPS.)
                                        ]
                                (INSPECTW.REPLACE inspectorWindow (QUOTE Tag)
                                                  NIL)
                                (INSPECTW.SELECTITEM inspectorWindow (QUOTE Tag))
                                [PLAYTUNE (QUOTE ((1500 . 200)
                                                  (2000 . 500)]
                                (printout (GETPROMPTWINDOW inspectorWindow 3)
                                          T T .PARA 0 0
                                          (QUOTE (New display object instance
                                                      installed.]
            "Create and install a display object according to the current specifications.")
                (IT←selection
                    (PROG NIL
                          [SETQ IT (CADDR (WINDOWPROP inspectorWindow (QUOTE
                                                                      CURRENTITEM]
                          (UNMARKASCHANGED IT (QUOTE VARS)))
                    "Sets the variable IT to the item selected in the specifier.")
                (Done (CLOSEW inspectorWindow)

"Close this display object specifier wihout installing a new display object.")))
                DisplayObjectSpecifierMenu])

(DisplayObjectSpecifier.VALUECOMMANDFN
  [LAMBDA (value prop obj inspectorWindow)            (* Bob&John "29-Sep-87 18:19")

(* * It's raining really hard.)

(EditWhen OPEN DisplayObjectSpecifier.VALUECOMMANDFN])
)
(PUTPROPS CHIPSDISPLAYOBJ COPYRIGHT ("University of Pittsburgh" 1987))
STOP
(FILECREATED "30-Sep-87 14:44:12" {PITTFS1:LRDC:PITT}<ONR>CHIPS>G>CHIPSSELECTION.;9 changes to:  (METHODS SelectionMixin.RespondToSelection SelectionMixin.GetPartAt
                              SelectionMixin.GetObjectAt SelectionMixin.EditSelectionResponse)
                     (FNS SelectionMixin.EditSelectionResponse SelectionMixin.GetObjectAt
                          SelectionMixin.GetPartAt SelectionMixin.RespondToSelection)

previous date: "23-Sep-87 20:55:47" {PITTFS1:LRDC:PITT}<ONR>CHIPS>G>CHIPSSELECTION.;8)

(* Copyright (c) 1987 by University of Pittsburgh. All rights reserved.)

(PRETTYCOMPRINT CHIPSSELECTIONCOMS)

(RPAQQ CHIPSSELECTIONCOMS ((CLASSES SelectionMixin)
                          (METHODS SelectionMixin.EditSelectionResponse SelectionMixin.GetObjectAt
                                   SelectionMixin.GetPartAt SelectionMixin.RespondToSelection)
                          (FNS)
                          (VARS)
                          (INSTANCES)
                          (MACROS GetResponseButton GetResponseSelector GetResponseTag)))
(DEFCLASSES SelectionMixin)
[DEFCLASS SelectionMixin
    (MetaClass ChipMeta Edited:                       (* jdc "24-Aug-87 21:53"))
    (Supers Object)
    (InstanceVariables
      (responsesToSelection ((map LEFT PP)
                             (map MIDDLE Edit))
                            doc
```

(* A list of elements: (tag button selector) for associating messages with (tag button) pairs.
(Use macros GetResponseTag GetResponseButton and GetResponseSelector to access them.) (Note: if selector is not an atom, it will be evaluated with self Position and Button bound. See DisplayObject.RespondToSelection))

```
                copyDown T))]

(← (S SelectionMixin) OldInstance)

[METH SelectionMixin EditSelectionResponse NIL
      (* * See class for details.)]

[METH SelectionMixin GetObjectAt (position)
      (* Return self. Finer distinctions are a subclass responsibility.)]

[METH SelectionMixin GetPartAt (position)
      (* * (QUOTE map)
        indicates this object was selected. Finer distinctions are a subclass responsibility.)]

[METH SelectionMixin RespondToSelection (Position Button)
      (* * Send the appropriate message to this chip depending on it's map.)]

(DEFINEQ (SelectionMixin.EditSelectionResponse
  (Method ((SelectionMixin EditSelectionResponse)           (* Bob&John "21-Aug-87 09:45")
          self)

(* * See class for details.)

(EDITE (@ responsesToSelection))))

(SelectionMixin.GetObjectAt
  (Method ((SelectionMixin GetObjectAt)                     (* Bob&John " 3-Sep-87 00:10")
          self position)                                    (* Return self. Finer distinctions are a subclass
                                                            responsibility.)

self))

(SelectionMixin.GetPartAt
  (Method ((SelectionMixin GetPartAt)                       (* Bob&John " 2-Sep-87 23:59")
          self position)

(* * (QUOTE map) indicates this object was selected. Finer distinctions are a subclass responsibility.)

(QUOTE map)))

(SelectionMixin.RespondToSelection
  [Method ((SelectionMixin RespondToSelection)
          self Position Button)                             (* Bob&John "21-Aug-87 09:45")

(* * Send the appropriate message to this chip depending on it's map.)

(PROG (partSelected responseSelector)
              (SETQ partSelected (← self GetPartAt Position))
              [SETQ responseSelector (GetResponseSelector (for r in (@ responsesToSelection)
                                                              thereis
                                                              (AND (EQ partSelected
                                                                       (GetResponseTag
                                                                            r))
                                                                   (EQ Button (
                                                                       GetResponseButton
                                                                            r]
              (if responseSelector
                  then (if (ATOM responseSelector)
                           then (←!
                                      self responseSelector)
                           else (EVAL responseSelector])
)
(DECLARE: EVAL@COMPILE
(DEFMACRO GetResponseButton (x)
        (BQUOTE (CADR , x)))
```

```
(DEFMACRO GetResponseSelector (x)
        (BQUOTE (CADDR , x)))
(DEFMACRO GetResponseTag (x)
        (BQUOTE (CAR , x)))
)
(PUTPROPS CHIPSSELECTION COPYRIGHT ("University of Pittsburgh" 1987))
STOP
        changes to:  (METHODS DisplayObjectManager.ToTop SketchMixin.EditPicture
                         SketchMixin.CopyEditRepresentation TeditPictureSpecification.EditPicture)
                     (FNS DisplayObjectManager.ToTop SetupUnderImageBackground
                         SketchMixin.CopyEditRepresentation SketchMixin.EditPicture
                         TeditPictureSpecification.EditPicture)
                     (CLASSES TeditPictureSpecification)
                     (VARS CHIPSGRAPHICSCOMS)

previous date: "30-Sep-87 14:43:05" (PITTFS1:LRDC:PITT)<ONR>CHIPS>G>CHIPSGRAPHICS.;23)

(* Copyright (c) 1987 by University of Pittsburgh. All rights reserved.)

(PRETTYCOMPRINT CHIPSGRAPHICSCOMS)

(RPAQQ CHIPSGRAPHICSCOMS ((CLASSES DisplayObjectManager GraphicalRelationshipsMixin
                             PictureSpecification SketchMixin)
        (METHODS DisplayObjectManager.AddJustInBack DisplayObjectManager.AddJustInFront
                 DisplayObjectManager.DrawUnder DisplayObjectManager.InformThoseILandedOn
                 DisplayObjectManager.PrepareToMove DisplayObjectManager.RemoveFromOccludedByMeList
                 DisplayObjectManager.RemoveFromOccludesMeList DisplayObjectManager.ToTop
                 DisplayObjectManager.WhoDoIOverlap? GraphicalRelationshipsMixin.Above?
                 GraphicalRelationshipsMixin.AdjacentTo? GraphicalRelationshipsMixin.Below?
                 GraphicalRelationshipsMixin.Inside? GraphicalRelationshipsMixin.Intersects?
                 GraphicalRelationshipsMixin.LeftOf? GraphicalRelationshipsMixin.Obscures?
                 GraphicalRelationshipsMixin.Occludes? GraphicalRelationshipsMixin.RightOf?
                 PictureSpecification.Draw PictureSpecification.GetBitmap
                 PictureSpecification.GetHeight PictureSpecification.GetWidth
                 PictureSpecification.OnYou? SketchMixin.ConvertEditRepToDisplayRep SketchMixin.Copy
                 SketchMixin.CopyEditRepresentation SketchMixin.EditPicture
                 SketchMixin.MakeCommandMenu)
        (FNS ConvertScreenToWindowCoords ConvertWindowToScreenCoords DeleteFromMap
             GetMapElementFromName GetNameForCopy InsertInMap InterpretMap SetupUnderImageBackground
             SubstituteCopiesForMapElements)
        (MACROS InRegionOrShadow?)
        (VARS PictureNotSpecifiedBitmap)))
(DEFCLASSES DisplayObjectManager GraphicalRelationshipsMixin PictureSpecification SketchMixin)
[DEFCLASS DisplayObjectManager
    (MetaClass Class Edited:                              (* Bob&John "27-Jul-87 14:21"))
    (Supers Object)
    (InstanceVariables (occludedByMe NIL doc              (* what display objects are under this display
                                                          object.))
                       (occludesMe NIL doc                (* what display objects are on top of this display
                                                          object.)))]

[DEFCLASS GraphicalRelationshipsMixin
    (MetaClass Class Edited:                              (* Bob&John " 4-Aug-87 22:46"))
    (Supers Object)]

[DEFCLASS PictureSpecification
    (MetaClass ChipMeta Edited:                           (* jdc "11-Sep-87 00:15")
               doc (* * This class of objects specifies pictures to be associated with Loops objects. It was developed to be used with
               the interface development tool Chips. Picture specifications store a display representation and an editing
               specification. Picture specifications are stored in the IV displayRepresentation They will not be bitmaps, but
               can be some other representation such as positions of points in a line, the height and width for rectangles, etc.
               Editing specifications are stored in the IV EditRepresentation. They are often stored in Sketch format to be used
               with the image editor.)

)
    (Supers UglyMixin FileMixin SketchMixin)
```

```
    (ClassVariables
(displayEditor ImageEditor doc                          (* The default display editor for this kind of picture
                                                           specification is the image editor.)) )
    (InstanceVariables
(displayRepresentation [HREADEXPR {(READBITMAP)(145 40
"OOOOOOOOOOOOOOOOOOOOOOOOOOOOOOOOOOOOOH@@@"
"OOOOOOOOOOOOOOOOOOOOOOOOOOOOOOOOOOOOOH@@@"
"OOOOOOOOOOOOOOOOOOOOOOOOOOOOOOOOOOOOCH@@@"
"OOOOOOOOOOOOOOOOOOOOOOOOOOOOOOOOOOOOOH@@@"
"OOOOOOOOL@CNGL@O@@BGOC@@GH@AOOOOOOOH@@@"
"OOOOOOOOL@ANG@@G@@BGOC@@CH@AOOOOOOOOH@@@"
"OOOOOOOOLOHNGANCOCNGOCCOAIOOOOOOOOOOH@@@"
"OOOOOOOOLOLNFCOCOCNGOCCOIIOOOOOOOOOOH@@@"
"OOOOOOOOLOLNFGOOOCNGOCCOIIOOOOOOOOOOH@@@"
"OOOOOOOOLOHNFGOOOCNGOCCOAH@COOOOOOOOH@@@"
"OOOOOOOOL@ANFGOOOCNGOC@@CH@COOOOOOOOH@@@"
"OOOOOOOOL@CNFGOOOCNGOC@@CIOOOOOOOOOOH@@@"
"OOOOOOOOLOONFGOCOCNGOCCOAIOOOOOOOOOOH@@@"
"OOOOOOOOLOONFCOCOCNGOCCOIIOOOOOOOOOOH@@@"
"OOOOOOOOLOONGANCOCNCNCCOIIOOOOOOOOOOH@@@"
"OOOOOOOOLOONG@@GOCO@@GCOIH@AOOOOOOOH@@@"
"OOOOOOOOLOONGL@OOCOH@OCOHH@AOOOOOOOOH@@@"
"OOOOOOOOOOOOOOOOOOOOOOOOOOOOOOOOOOOOOH@@@"
"OOOOOOOOOOOOOOOOOOOOOOOOOOOOOOOOOOOOOH@@@"
"OOOOOOOOOOOOOOOOOOOOOOOOOOOOOOOOOOOOOH@@@"
"OOOOOOOOOOOOOOOOOOOOOOOOOOOOOOOOOOOOOH@@@"
"OOOOOOOOOOOOOOOOOOOOOOOOOOOOOOOOOOOOOH@@@"
"OOOOOOOOOOOOOOOOOOOOOOOOOOOOOOOOOOOOOH@@@"
"OAOIO@CN@@GOL@O@@O@@CN@GLL@@LL@@L@GOH@@@"
"OAOIL@@N@@GOH@G@@G@@CH@CLL@@LL@@L@AOH@@@"
"O@OILGHONGOOANCCNGCOOHOALLOOLLOOLO@OH@@@"
"O@GIHOLGNGOOCOCCOCCOOAOILLOOLLOOLOLOH@@@"
"OBGIIONGNGOO@OOCNC@@GCOOLL@CLL@ALONGH@@@"
"OCCIIONGNGOOH@OCNC@@GCOOLL@CLL@ALONGH@@@"
"OCAIIONGNGOON@G@@G@@GCOOLL@CLL@ALONGH@@@"
"OCIIIONGNGOOONC@@OCOOCOOLLOOLLOOLONGH@@@"
"OCLIIONGNGOOCOCCOOCOOCOILLOOLLOOLOLGH@@@"
"OCLAHOLGNGOOCOCCOOCOOAOILLOQLLOOLOLOH@@@"
"OCNALGHONGOOANCCOOCOOHOALLOOLLOOLO@OH@@@"
"OCOAL@@ONGOOH@GCOO@@CH@CLLOOLL@@L@AOH@@@"
"OCOAO@CONGOOL@OCOO@@CN@GLLOOLL@@L@GOH@@@"
"OOOOOOOOOOOOOOOOOOOOOOOOOOOOOOOOOOOOOH@@@"
"OOOOOOOOOOOOOOOOOOOOOOOOOOOOOOOOOOOOOH@@@"
"OOOOOOOOOOOOOOOOOOOOOOOOOOOOOOOOOOOOOH@@@"
"OOOOOOOOOOOOOOOOOOOOOOOOOOOOOOOOOOOOOH@@@"}}
]Ugly (Value) doc                                       (* The graphical representation of an object that is
                                                           used to display it on the screen.
                                                           (a bitmap.)) )

(editRepresentation [Decode&HREAD
" ((SKETCH PictureSpecification SKET"
"CHCONTEXT ((ROUND 1 0) (HELVETICA "
" 10 (MEDIUM REGULAR REGULAR))
 (CE"
"NTER BASELINE) (LINE 30.0 12) NIL "
"NIL (CENTER CENTER) (NIL NIL) T NI"
"L NIL 1.0)) NIL)
"]Horrible (Value) copy NIL DontSave (copy) doc         (* A representation of a screen object that allows it
                                                           to be easily editied. Often stored in Sketch format.)
)
(offset (0 . 0)
        doc                                             (* The offset from the lower left corner of the
                                                           display object that this instance of
        ))],                                            PictureSpecification occupies.)
```

(← (S PictureSpecification) OldInstance)

[DEFCLASS SketchMixin
    (MetaClass Class Edited:                               ("jdc "8-Sep-87 13:26"))
    (Supers Object)]

[METH DisplayObjectManager AddJustInBack (displayObject)
    (* * Insert this display object instance at the head of the occludedByMe iv. Insures uniqueness.)]

[METH DisplayObjectManager AddJustInFront (displayObject)
    (* * Put displayObject at the end of the occludesMe iv. Insures uniqueness.)]

[METH DisplayObjectManager DrawUnder (stream)
    (* * Draw everything under this view to the displayStream specified by stream at the position specified by position.)]

[METH DisplayObjectManager InformThoseILandedOn NIL
    (* * Update all things that are now underneath the chip that was just moved.)]

[METH DisplayObjectManager PrepareToMove NIL
    (* * Prepare to move self by updating all those things underneath and on top of it.)]

[METH DisplayObjectManager RemoveFromOccludedByMeList (view)
    (* * Remove view from underneath self.)]

[METH DisplayObjectManager RemoveFromOccludesMeList (view)
    (* * Remove otherChip from the top of self.)]

[METH DisplayObjectManager ToTop (dontDisplay?)
    (* Handles the housework of bringing a chip to top. Useful for animating chips among other things.)]

[METH DisplayObjectManager WhoDoIOverlap? NIL
    (* * Return a list of displayObjects that overlap my region.)]

[METH GraphicalRelationshipsMixin Above? (otherDisplayObject)
    (* * Is this display object completely above otherDisplayObject?)]

[METH GraphicalRelationshipsMixin AdjacentTo? (otherDisplayObject tolerance)
    (* * Is this display object within tolerance pixels of the other display object?)]

[METH GraphicalRelationshipsMixin Below? (otherDisplayObject)
    (* * Is this display object completely below otherDisplayObject?)]

[METH GraphicalRelationshipsMixin Inside? (otherDisplayObject part otherPart)
    (* * Is this display object completely inside the other display object?)]

[METH GraphicalRelationshipsMixin Intersects? (otherDisplayObject part otherPart)
    (* * Do these two display objects or their specified parts intersect?)]

[METH GraphicalRelationshipsMixin LeftOf? (otherDisplayObject)
    (* * Is this display object completely to the left of otherDisplayObject?)]

[METH GraphicalRelationshipsMixin Obscures? (otherDisplayObject part otherPart)
    (* * Is this display object or its specified part inside the other one or its specified part and does it occlude the other?)]

[METH GraphicalRelationshipsMixin Occludes? (otherDisplayObject part otherPart)
    (* * Does this display object or its specified part occlude the other display object or its specified part?)]

[METH GraphicalRelationshipsMixin RightOf? NIL
    (* * Is this display object completely to the right of otherDisplayObject?)]

[METH PictureSpecification Draw (stream position operation clippingRegion)
    (* * Draw this picture specification's display representation on the specified stream at the
        specified position. Default picture specifications use bitmaps so this method uses BITBLT.)]

[METH PictureSpecification GetBitmap NIL
    (* * Make a bitmap from this picture specification's display representation. Since it is
        already a bitmap for this kind of picture, return that bitmap. This is used for animating
        views around the screen.)]

[METH PictureSpecification GetHeight NIL
    (* * Return the height of the display representation of this picture specification. This method
        is dependent on the fact that the picture representation is a bitmap. This method will have
        to be specialized for picture specifications whose display representation is not a bitmap.)]

[METH PictureSpecification GetWidth NIL
    (* * Return the width of the display representation of this picture specification. This method
        is dependent on the fact that the picture representation is a bitmap. This method will have
        to be specialized for picture specifications whose display representation is not a bitmap.)]

[METH PictureSpecification OnYou? (x y)
    (* * Are the coordinates x and y on the "active" parts of this picture. Since the default
        picture specification stores bitmaps, this will test if the position specifies a bit in the
        bitmap that is on. This will need to be specialized for other kinds of picture
        specifications.)]

[METH SketchMixin ConvertEditRepToDisplayRep (sketchWindow displayObjectRegion iconName)
    (* * Converts a graphics representation stored in editing format to the representation used to
        display it on the screen. This method converts things stored in Sketch format to a bitmap.
        If you want some other conversion, you will have to specialize this message for a new class.)
]

[METH SketchMixin Copy (name copyDisplayRep? copyEditRep?)
    (* * Return a copy of this instance of PictureSpecification. If copyDisplayRep? is non-NIL,
        make a copy of its bitmap. If copyEditRep is non-NIL, make a copy of its Sketch.)]

[METH SketchMixin CopyEditRepresentation NIL
    (* * Copy the Sketch that serves as this picture specification instance's edit representation
        using HCOPYALL.)]

[METH SketchMixin EditPicture (editRepresentation window)
    (* * Edit this picture in window. Change window into a Sketch window if it is not already one.)]

[METH SketchMixin MakeCommandMenu NIL
    (* * Create a specialized version of the Sketch command menu for use in the image editor.)]

(DEFINEQ (DisplayObjectManager.AddJustInBack
    [Method ((DisplayObjectManager AddJustInBack)
             self displayObject)                    (* Bob&John " 5-Sep-87 17:14")

(* * Insert this display object instance at the head of the occludedByMe iv. Insures uniqueness.)

(←@
            occludedByMe
            (PutAtHead displayObject (@ occludedByMe])

(DisplayObjectManager.AddJustInFront
    [Method ((DisplayObjectManager AddJustInFront)
             self displayObject)                    (* Bob&John " 5-Sep-87 17:12")

(* * Put displayObject at the end of the occludesMe iv. Insures uniqueness.)

(←@
            occludesMe
            (PutAtTail displayObject (@ occludesMe])

```
(DisplayObjectManager.DrawUnder
  (Method ((DisplayObjectManager DrawUnder)
           self stream)                                    (* Bob&John "15-Aug-87 20.53")

(* * Draw everything under this view to the displayStream specified by stream at the position specified by
    position.)

(LET* [(position (@ position))
           (stream (OR stream scratchBitmap))
           (window (@ displayStream))
           [windowRegion (CREATEREGION 0 0 (WINDOWPROP window (QUOTE WIDTH))
                                           (WINDOWPROP window (QUOTE HEIGHT]
           (viewRegion (← self GetRegion))
           (viewWindowIntersect (INTERSECTREGIONS viewRegion windowRegion))
           (bmClippingRegion (if viewWindowIntersect
                                 then (CREATEREGION (DIFFERENCE (fetch (REGION LEFT)
                                                                   of
                                                                   viewWindowIntersect)
                                                                (fetch (REGION LEFT)
                                                                   of viewRegion))
                                                    (DIFFERENCE (fetch (REGION BOTTOM)
                                                                   of
                                                                   viewWindowIntersect)
                                                                (fetch (REGION BOTTOM)
                                                                   of viewRegion))
                                                    (fetch (REGION WIDTH) of
                                                                   viewWindowIntersect)
                                                    (fetch (REGION HEIGHT) of
                                                                   viewWindowIntersect]
          (if viewWindowIntersect
              then (SetupUnderImageBackground windowRegion viewRegion window
                                              viewWindowIntersect stream)
                   (for displayObject in (@ occludedByMe)
                        do (← displayObject Draw stream (SubtractPositions (@
                                                                       displayObject
                                                                       position)
                                                                      position)
                                                         bmClippingRegion))
                   (for displayObject in (@ occludesMe)
                        do (← displayObject Draw stream (SubtractPositions (@
                                                                       displayObject
                                                                       position)
                                                                      position)
                                                         bmClippingRegion))
                   stream))))

(DisplayObjectManager.InformThoseILandedOn
  (Method ((DisplayObjectManager InformThoseILandedOn)
           self)                                           (* Bob&John " 6-Sep-87 16:42")

(* * Update all things that are now underneath the chip that was just moved.)

(for displayObject in (← self WhoDoIOverlap?)
         do (← displayObject AddJustInFront self)
            (← self AddJustInBack displayObject))))

(DisplayObjectManager.PrepareToMove
  (Method ((DisplayObjectManager.PrepareToMove)
           self)                                           (* Bob&John "27-Jul-87 14:22")

(* * Prepare to move self by updating all those things underneath and on top of it.)

(LET* ((viewRegion (← self GetRegion))
           (width (fetch (REGION WIDTH) of viewRegion))
           (height (fetch (REGION HEIGHT) of viewRegion))
           (x (fetch (REGION LEFT) of viewRegion))
           (y (fetch (REGION BOTTOM) of viewRegion)))
          (← self DrawUnder scratchBitmap)
          (BITBLT scratchBitmap 0 0 (@ displayStream)
                  x y width height (QUOTE INPUT)
                  (QUOTE REPLACE))
          (for view in (@ occludedByMe) do (← view RemoveFromOccludesMeList self))
          (for view in (@ occludesMe) do (← view RemoveFromOccludedByMeList self))
          (←@
            occludedByMe NIL)
          (←@
            occludesMe NIL))))
```

```
(DisplayObjectManager.RemoveFromOccludedByMeList
  [Method ((DisplayObjectManager RemoveFromOccludedByMeList)
           self view)                                          (* Bob&John "27-Jul-87 14:22")

(* * Remove view from underneath self.)

(←@
      occludedByMe
      (DREMOVE view (@ occludedByMe])

(DisplayObjectManager.RemoveFromOccludesMeList
  [Method ((DisplayObjectManager RemoveFromOccludesMeList)
           self view)                                          (* Bob&John "27-Jul-87 14:22")

(* * Remove otherChip from the top of self.)

(←@
      occludesMe
      (DREMOVE view (@ occludesMe])

(DisplayObjectManager.ToTop
  (Method ((DisplayObjectManager ToTop)
           self dontDisplay?)                                  (* Bob&John " 5-Oct-87 19:20")
                                                               (* Handles the housework of bringing a chip to top.
                                                               Useful for animating chips among other things.)

(for view in (@ occludesMe)
       do (← view RemoveFromOccludedByMeList self)
          (← view AddJustInFront self)
          (← self RemoveFromOccludesMeList view)
          (← self AddJustInBack view))
    (← (@ host)
       AddInFront self dontDisplay?)))

(DisplayObjectManager.WhoDoIOverlap?
  (Method ((DisplayObjectManager WhoDoIOverlap?)
           self)                                               (* Bob&John "28-Jul-87 14:54")

(* * Return a list of displayObjects that overlap my region.)

(bind (reg ← (← self GetRegion)) for displayObject in (@ (@ host)
                                                                        contents)
       when (AND (NEQ self displayObject)
                 (REGIONSINTERSECTP reg (← displayObject GetRegion)))
       collect displayObject)))

(GraphicalRelationshipsMixin.Above?
  [Method ((GraphicalRelationshipsMixin Above?)
           self otherDisplayObject)                            (* Bob&John " 5-Aug-87 00:05")

(* * Is this display object completely above otherDisplayObject?)

(LET ((region1 (← self GetRegion))
          (region2 (← otherDisplayObject GetRegion)))
      (if (GREATERP (fetch (REGION BOTTOM) of region1)
                    (PLUS (fetch (REGION BOTTOM) of region2)
                          (fetch (REGION HEIGHT) of region2)))
          then (DIFFERENCE (fetch (REGION BOTTOM) of region1)
                           (PLUS (fetch (REGION BOTTOM) of region2)
                                 (fetch (REGION HEIGHT) of region2])

(GraphicalRelationshipsMixin.AdjacentTo?
  (Method ((GraphicalRelationshipsMixin AdjacentTo?)
           self otherDisplayObject tolerance)                  (* Bob&John " 5-Aug-87 00:47")

(* * Is this display object within tolerance pixels of the other display object?)

(LET ((leftDistance (← self LeftOf? otherDisplayObject))
          (rightDistance (← self RightOf? otherDisplayObject))
          (belowDistance (← self Below? otherDisplayObject))
          (aboveDistance (← self Above? otherDisplayObject)))
      (if (AND (NUMBERP leftDistance)
               (LESSP leftDistance tolerance))
          then T
        elseif (AND (NUMBERP rightDistance)
                    (LESSP rightDistance tolerance))
          then T
```

```
                elseif (AND (NUMBERP belowDistance)
                            (LESSP belowDistance tolerance))
                    then T
                elseif (AND (NUMBERP aboveDistance)
                            (LESSP aboveDistance tolerance))
                    then T))))
```

(GraphicalRelationshipsMixin.Below?
  [Method ((GraphicalRelationshipsMixin Below?)
           self otherDisplayObject)                  (* Bob&John " 5-Aug-87 00:49")

(* * Is this display object completely below otherDisplayObject?)

```
        (LET ((region1 (← self GetRegion))
              (region2 (← otherDisplayObject GetRegion)))
             (if (LESSP (PLUS (fetch (REGION BOTTOM) of region1)
                              (fetch (REGION HEIGHT) of region1))
                        (fetch (REGION BOTTOM) of region2))
                 then (DIFFERENCE (fetch (REGION BOTTOM) of region2)
                                  (PLUS (fetch (REGION BOTTOM) of region1)
                                        (fetch (REGION HEIGHT) of region1])
```

(GraphicalRelationshipsMixin.Inside?
  [Method ((GraphicalRelationshipsMixin Inside?)
           self otherDisplayObject part otherPart)    (* Bob&John "25-Sep-87 04:20")

(* * Is this display object completely inside the other display object?)

```
        (LET* ((position1 (@ position))
               (position2 (@ otherDisplayObject position))
               [partPictureSpec (if part
                                    then (GetMapElementFromName part (@ map])
               [otherPartPictureSpec (if otherPart
                                         then (GetMapElementFromName otherDisplayObjectpart
                                                                     (@ otherDisplayObject map]
               (compareBitmap (BITMAPCREATE (← self GetWidth)
                                            (← self GetHeight)))
               (pictureSeparation (SubtractPositions position2 position1)))
              (if (OR (AND part (NOT partPictureSpec))
                      (AND otherPart (NOT otherPartPictureSpec)))
                  then (ERROR
         "You specified a part for the intersection but there was no picture specification for that part.")
                  elseif (AND part otherPart)
                      then (PictureInsideP partPictureSpec otherPartPictureSpec
                                           (fetch (POSITION XCOORD) of pictureSeparation)
                                           (fetch (POSITION YCOORD) of pictureSeparation)
                                           compareBitmap)
                  elseif (AND (NOT part)
                              otherPart)
                      then (PictureInsideP (CADR (@ map))
                                           otherPartPictureSpec
                                           (fetch (POSITION XCOORD) of pictureSeparation)
                                           (fetch (POSITION YCOORD) of pictureSeparation)
                                           compareBitmap)
                  elseif (AND part (NOT otherPart))
                      then (PictureInsideP partPictureSpec (CADR (@ otherDisplayObject map))
                                           (fetch (POSITION XCOORD) of pictureSeparation)
                                           (fetch (POSITION YCOORD) of pictureSeparation)
                                           compareBitmap)
                  else (PictureInsideP (CADR (@ map))
                                       (CADR (@ otherDisplayObject map))
                                       (fetch (POSITION XCOORD) of pictureSeparation)
                                       (fetch (POSITION YCOORD) of pictureSeparation)
                                       compareBitmap])
```

(GraphicalRelationshipsMixin.Intersects?
  [Method ((GraphicalRelationshipsMixin Intersects?)
           self otherDisplayObject part otherPart)    (* Bob&John " 5-Aug-87 00:26")

(* * Do these two display objects or their specified parts intersect?)

```
        (LET* ((position1 (@ position))
               (position2 (@ otherDisplayObject position))
               [partPictureSpec (if part
                                    then (GetMapElementFromName part (@ map]
```

```
                    [otherPartPictureSpec (if otherPart
                                            then (GetMapElementFromName otherDisplayObjectpart
                                                                            (@ otherDisplayObject map]
                (compareBitmap (BITMAPCREATE (← self GetWidth)
                                             (← self GetHeight)))
                (pictureSeparation (SubtractPositions position2 position1)))
               (if (OR (AND part (NOT partPictureSpec))
                       (AND otherPart (NOT otherPartPictureSpec)))
                   then (ERROR
"You specified a part for the intersection but there was no picture specification for that part.")
                   elseif (AND part otherPart)
                   then (PicturesIntersectP partPictureSpec otherPartPictureSpec
                                            (fetch (POSITION XCOORD) of pictureSeparation)
                                            (fetch (POSITION YCOORD) of pictureSeparation)
                                            compareBitmap)
                   elseif (AND (NOT part)
                               otherPart)
                   then (PicturesIntersectP (CADR (@ map))
                                            otherPartPictureSpec
                                            (fetch (POSITION XCOORD) of pictureSeparation)
                                            (fetch (POSITION YCOORD) of pictureSeparation)
                                            compareBitmap)
                   elseif (AND part (NOT otherPart))
                   then (PicturesIntersectP partPictureSpec (CADR (@ otherDisplayObject map))
                                            (fetch (POSITION XCOORD) of pictureSeparation)
                                            (fetch (POSITION YCOORD) of pictureSeparation)
                                            compareBitmap)
                   else (PicturesIntersectP (CADR (@ map))
                                            (CADR (@ otherDisplayObject map))
                                            (fetch (POSITION XCOORD) of pictureSeparation)
                                            (fetch (POSITION YCOORD) of pictureSeparation)
                                            compareBitmap])
```

(GraphicalRelationshipsMixin.LeftOf?
  [Method ((GraphicalRelationshipsMixin LeftOf?)
           self otherDisplayObject)                          (* Bob&John " 5-Aug-87 00:07")

(* * Is this display object completely to the left of otherDisplayObject?)

(LET ((region1 (← self GetRegion))
                (region2 (← otherDisplayObject GetRegion)))
               (if (LESSP (PLUS (fetch (REGION LEFT) of region1)
                                (fetch (REGION WIDTH) of region1))
                          (fetch (REGION LEFT) of region2))
                   then (DIFFERENCE (fetch (REGION LEFT) of region2)
                                    (PLUS (fetch (REGION LEFT) of region1)
                                          (fetch (REGION WIDTH) of region1])

(GraphicalRelationshipsMixin.Obscures?
  (Method ((GraphicalRelationshipsMixin Obscures?)
           self otherDisplayObject part otherPart)    •      (* Bob&John " 5-Aug-87 00:03")

(* * Is this display object or its specified part inside the other one or its specified part and does it occlude
  the other?)

(AND (FMEMB self (@ otherDisplayObject occludesMe))
               (← self Inside? otherDisplayObject part otherPart))))

(GraphicalRelationshipsMixin.Occludes?
  (Method ((GraphicalRelationshipsMixin Occludes?)
           self otherDisplayObject part otherPart)           (* Bob&John " 4-Aug-87 23:35")

(* * Does this display object or its specified part occlude the other display object or its specified part?)

(AND (FMEMB self (@ otherDisplayObject occludesMe))
               (← self Intersects? otherDisplayObject part otherPart))))

(GraphicalRelationshipsMixin.RightOf?
  [Method ((GraphicalRelationshipsMixin RightOf?)
           self)                                             (* Bob&John " 5-Aug-87 00:07")

(* * Is this display object completely to the right of otherDisplayObject?)

```
            (LET ((region1 (← self GetRegion))
                  (region2 (← otherDisplayObject GetRegion)))
                (if (GREATERP (fetch (REGION LEFT) of region1)
                              (PLUS (fetch (REGION LEFT) of region2)
                                    (fetch (REGION WIDTH) of region2)))
                    then (DIFFERENCE (fetch (REGION LEFT) of region1)
                                     (PLUS (fetch (REGION LEFT) of region2)
                                           (fetch (REGION WIDTH) of region2])
```

(PictureSpecification.Draw
    (Method ((PictureSpecification Draw)
            self stream position operation clippingRegion)      (* Bob&John "21-Aug-87 06:43")

(* * Draw this picture specification's display representation on the specified stream at the specified position.
    Default picture specifications use bitmaps so this method uses BITBLT.)

(LET [(displayRep (@ displayRepresentation))
                  (position (AddPositions position (@ offset]
                (BITBLT displayRep NIL NIL stream (fetch (POSITION XCOORD) of position)
                        (fetch (POSITION YCOORD) of position)
                        (BITMAPWIDTH displayRep)
                        (BITMAPHEIGHT displayRep)
                        (QUOTE INPUT)
                        operation NIL clippingRegion))))

(PictureSpecification.GetBitmap
    (Method ((PictureSpecification GetBitmap)
            self)                                               (* Bob&John "21-Aug-87 06:25")

(* * Make a bitmap from this picture specification's display representation. Since it is already a bitmap for this
    kind of picture, return that bitmap. This is used for animating views around the screen.)

(@ displayRepresentation)))

(PictureSpecification.GetHeight
    (Method ((PictureSpecification GetHeight)
            self)                                               (* Bob&John "25-Aug-87 03:17")

(* * Return the height of the display representation of this picture specification. This method is dependent on the
    fact that the picture representation is a bitmap. This method will have to be specialized for picture
    specifications whose display representation is not a bitmap.)

(if (BITMAPP (@ displayRepresentation))
                then (PLUS (OR (fetch (POSITION YCOORD) of (@ offset))
                               0)
                           (BITMAPHEIGHT (@ displayRepresentation)))
                else 0)))

(PictureSpecification.GetWidth
    (Method ((PictureSpecification GetWidth)
            self)                                               (* Bob&John "28-Aug-87 22:25")

(* * Return the width of the display representation of this picture specification. This method is dependent on the
    fact that the picture representation is a bitmap. This method will have to be specialized for picture
    specifications whose display representation is not a bitmap.)

(if (BITMAPP (@ displayRepresentation))
                then (PLUS (OR (fetch (POSITION XCOORD) of (@ offset))
                               0)
                           (BITMAPWIDTH (@ displayRepresentation)))
                else 0)))

(PictureSpecification.OnYou?
    [Method ((PictureSpecification OnYou?)
            self x y)                                           (* Bob&John " 7-Sep-87 00:27")

(* * Are the coordinates x and y on the "active" parts of this picture. Since the default picture specification
    stores bitmaps, this will test if the position specifies a bit in the bitmap that is on. This will need to be
    specialized for other kinds of picture specifications.)

(NOT (ZEROP (BITMAPBIT (@ displayRepresentation)
                                   (DIFFERENCE x (X (@ offset)))
                                   (DIFFERENCE y (Y (@ offset])

(SketchMixin.ConvertEditRepToDisplayRep
  [Method ((SketchMixin ConvertEditRepToDisplayRep)
          self sketchWindow displayObjectRegion iconName)     (* Bob&John "8-Sep-87 13:42 ")

(* * Converts a graphics representation stored in editing format to the representation used to display it on the
  screen. This method converts things stored in Sketch format to a bitmap. If you want some other conversion, you
  will have to specialize this message for a new class.)

(if (AND (@ editRepresentation)
                   (SK.SCREEN.ELEMENTS.FROM.SKETCH (@ editRepresentation)
                                                  sketchWindow))
              then (LET* [(sketchRegion (SK.REGION.OCCUPIED.BY.ELEMENTS (@ editRepresentation)
                                                                       sketchWindow))
                          (newBM (BITMAPCREATE (fetch (REGION WIDTH) of sketchRegion)
                                               (fetch (REGION HEIGHT) of sketchRegion)))
                          (xOffset (DIFFERENCE (fetch (REGION LEFT) of sketchRegion)
                                               (fetch (REGION LEFT) of displayObjectRegion)))
                          (yOffset (DIFFERENCE (fetch (REGION BOTTOM) of sketchRegion)
                                               (fetch (REGION BOTTOM) of displayObjectRegion]
                    (←@
                      offset
                      (CREATEPOSITION xOffset yOffset))
                    (←@
                      displayRepresentation newBM)
                    (CLEARW sketchWindow)
                    (DRAW.LOCAL.SKETCH (MAKE.LOCAL.SKETCH (@ editRepresentation)
                                                          (CREATEREGION 0 0
                                                                        (← self
                                                                           GetWidth)
                                                                        (← self
                                                                           GetHeight))
                                                          1.0 sketchWindow T)
                                       sketchWindow)
                    (BITBLT sketchWindow (fetch (REGION LEFT) of sketchRegion)
                            (fetch (REGION BOTTOM) of sketchRegion)
                            newBM])

(SketchMixin.Copy
  (Method ((SketchMixin Copy)
          self name copyDisplayRep? copyEditRep?)     (* Bob&John "23-Sep-87 18:47")

(* * Return a copy of this instance of PictureSpecification. If copyDisplayRep? is non-NIL, make a copy of its
  bitmap. If copyEditRep is non-NIL, make a copy of its Sketch.)

(LET ((copy (CopyInstance self)))
               (if name
                   then (← copy SetName name))
               [if copyDisplayRep?
                   then (←@
                          copy displayRepresentation (NEWSYM (@ displayRepresentation)))
                        (SETATOMVAL (@ copy displayRepresentation)
                                    (BITMAPCOPY (GETATOMVAL (@ displayRepresentation]
               [if copyEditRep?
                   then (if (NOT (ATOM (@ editRepresentation)))
                            then (←@
                                   copy editRepresentation (COPY.SKETCH (@ editRepresentation)
                                                                        name]
               copy)))

(SketchMixin.CopyEditRepresentation
  (Method ((SketchMixin CopyEditRepresentation)
          self)     (* Bob&John "2-Oct-87 16:04")

(* * Copy the Sketch that serves as this picture specification instance's edit representation using HCOPYALL.)

(HCOPYALL (@ editRepresentation))))

(SketchMixin.EditPicture
  (Method ((SketchMixin EditPicture)
          self editRepresentation window)     (* Bob&John "2-Oct-87 15:44")

(* * Edit this picture in window. Change window into a Sketch window if it is not already one.)

(EditWhen OPEN SketchMixin.EditPicture)
          (PROG NIL
                (if [OR (NOT (WINDOWP window))
                        (NULL (WINDOWPROP window (QUOTE SKETCH]
                    then (SETQ window
                               (SKETCHW.CREATE editRepresentation NIL
                                               (if (WINDOWP window)

```
                                    then (WINDOWPROP window (QUOTE REGION))
                                    else (LET [(reg (UNIONREGIONS
                                                          (
                                                          SK.REGION.OCCUPIED.BY.ELEMENTS
                                                             editRepresentation)
                                                          (QUOTE (0 0 300 300]
                                                (replace (REGION LEFT) of reg
                                                        with LASTMOUSEX)
                                                (replace (REGION BOTTOM)
                                                        of reg with LASTMOUSEY)
                                            reg))
                                        (CONCAT (OR (GetObjectName self)
                                                     (ClassName self))
                                                " Display Editor")
                                        NIL
                                        (← self MakeCommandMenu)))
                (WINDOWPROP window (QUOTE REDISPLAYFN)
                            (FUNCTION ChipsSketchRepaintFn))
                (WINDOWPROP window (QUOTE REPAINTFN)
                            (FUNCTION ChipsSketchRepaintFn))
                (WINDOWPROP window (QUOTE DONTQUERYCHANGES)
                            T)
                (WINDOWADDPROP window (QUOTE OPENFN)
                                (FUNCTION ChipsSketchOpenFn)))
            (WINDOWPROP window (QUOTE TITLE)
                        (CONCAT (OR (GetObjectName self)
                                    (ClassName self))
                                " Display Editor"))
            (WINDOWPROP window (QUOTE SKETCH)
                        editRepresentation)
            (MAP.SKETCHSPEC.INTO.VIEWER editRepresentation window)
            (SK.CREATE.HOTSPOT.CACHE window)
            (REDISPLAYW window)
            (RETURN window))))
```

(SketchMixin.MakeCommandMenu
    (Method ((SketchMixin MakeCommandMenu)
             self)                                              (* Bob&John "14-Sep-87 23:33")

(* * Create a specialized version of the Sketch command menu for use in the image editor.)

(create MENU
            ITEMS ← (APPEND imageEditorMenuPart1 (for item in (fetch ITEMS
                                                                    of (
                                                            CREATE.SKETCHW.COMMANDMENU))
                                                    when (BITMAPP (CAR item))
                                                    collect item)
                            imageEditorMenuPart3)
            WHENSELECTEDFN ← (FUNCTION SKETCHW.SELECTIONFN))))
(DEFINEQ (ConvertScreenToWindowCoords
    [LAMBDA (window XorPos Y)                                   (* Bob&John "25-Aug-86 11:49")

(* * Convert from screen to window coordinates.)

(LET [(reg (WINDOWPROP window (QUOTE REGION)))
          (border (WINDOWPROP window (QUOTE BORDER]
        (if (POSITIONP XorPos)
            then (CREATEPOSITION (DIFFERENCE (CAR XorPos)
                                              (IPLUS (CAR reg)
                                                     border))
                                 (DIFFERENCE (CDR XorPos)
                                              (IPLUS (CADR reg)
                                                     border)))
            else (CREATEPOSITION (DIFFERENCE XorPos (IPLUS (CAR reg)
                                                           border))
                                 (DIFFERENCE Y (IPLUS (CADR reg)
                                                      border])

(ConvertWindowToScreenCoords
    [LAMBDA (window xOrPos y)                                   (* Bob&John "29-Sep-87 18:20")

(* * Convert window coordinates into screen coordinates. But I bet you got that from the name, huh?)

```
            (LET [(position (OR (POSITIONP xOrPos)
                                (CREATEPOSITION xOrPos y)))
                  (windowRegion (WINDOWPROP window (QUOTE REGION]
                 (CREATEPOSITION (PLUS (fetch (REGION LEFT) of windowRegion)
                                       (WINDOWPROP window (QUOTE BORDER))
                                       (fetch (POSITION XCOORD) of position))
                                 (PLUS (fetch (REGION BOTTOM) of windowRegion)
                                       (WINDOWPROP window (QUOTE BORDER))
                                       (fetch (POSITION YCOORD) of position])

(DeleteFromMap
    [LAMBDA (map element)                                   (* Bob&John "29-Sep-87 18:21")

(* * Destructively delete the element indicated by element (a tag) from a map.)

(if map
        then [RPLACD (CDR map)
                    (for submap in (CDDR map) join (if (EQ (CAR submap)
                                                            element)
                                                        then (CDDR submap)
                                                        else (LIST (DeleteFromMap
                                                                     submap element]
            map])

(GetMapElementFromName
    [LAMBDA (name map)                                      (* Bob&John "29-Sep-87 18:22")

(* * Given a map element tag, return the picture specification that that tag tags.)

(if map
        then (LET (mapElement)
                [if (EQ name (CAR map))
                    then (SETQ mapElement (CADR map))
                    else (for submap in (CDDR map) thereis (SETQ mapElement
                                                                (GetMapElementFromName
                                                                  name submap])
            mapElement])

(GetNameForCopy
    [LAMBDA (copyItem)                                      (* Bob&John "30-Jul-87 20:35")

(* * Creates a new name for copies of an instance.)

(if (GetObjectName copyItem)
        then (NEWSYM (MKATOM (CONCAT (GetObjectName copyItem)
                                    "Copy")))
        else (NEWSYM (ClassName copyItem])

(InsertInMap
    [LAMBDA (map element afterWho?)                         (* Bob&John "29-Sep-87 18:23")

(* * Destructively insert a new map element after the map element indicated by afterWho?)

(if map
        then (if (EQ afterWho? (CAR map))
                then (RPLACD (CDR map)
                            (CONS element (CDDR map)))
                else (for submap in (CDDR map) do (InsertInMap submap element afterWho?])

(InterpretMap
    [LAMBDA (map x y)                                       (* Bob&John " 7-Sep-87 01:26")

(* * Map is assumed to be in the form: (formToReturn pictureSpecification (subreg1 subreg2 ...)))

(if (AND (CADR map)
             (← (CADR map)
                OnYou? x y))
        then (LET [(val (OR (bind place for submap in (CDDR map)
                                do (SETQ place (InterpretMap submap x y))
                                (if place
                                    then (RETURN place)))
                            (CAR map]
                val)
        else NIL])

(SetupUnderImageBackground
    [LAMBDA (windowRegion viewRegion window viewWindowIntersect bm)
                                                            (* Bob&John " 5-Oct-87 19:15")

(* * Set up the under image background of a display object. This is complicated by the fact that display objects
        may be partially · and out of a substrate in which case the under image must include the border of the window and
        anything adjacent to the window.)
```

```
            (if (SUBREGIONP windowRegion viewRegion)
                then (BLTSHADE (MatchWindowTexture window (CREATEPOSITION (fetch (REGION LEFT)
                                                                                of viewRegion)
                                                                         (fetch (REGION BOTTOM)
                                                                                of viewRegion))
                               bm)
                else (BITBLT (SCREENBITMAP)
                             (PLUS (fetch (REGION LEFT) of (WINDOWPROP window (QUOTE REGION)))
                                   (fetch (REGION LEFT) of viewRegion)
                                   (WINDOWPROP window (QUOTE BORDER)))
                             (PLUS (fetch (REGION BOTTOM) of (WINDOWPROP window (QUOTE REGION)))
                                   (fetch (REGION BOTTOM) of viewRegion)
                                   (WINDOWPROP window (QUOTE BORDER)))
                             bm NIL NIL (fetch (REGION WIDTH) of viewRegion)
                             (fetch (REGION HEIGHT) of viewRegion))
                     (BLTSHADE (MatchWindowTexture window (CREATEPOSITION (fetch (REGION LEFT)
                                                                                 of viewRegion)
                                                                          (fetch (REGION BOTTOM)
                                                                                 of viewRegion))
                               bm)
                     bm
                     (DIFFERENCE (fetch (REGION LEFT) of viewWindowIntersect)
                                 (fetch (REGION LEFT) of viewRegion))
                     (DIFFERENCE (fetch (REGION BOTTOM) of viewWindowIntersect)
                                 (fetch (REGION BOTTOM) of viewRegion))
                     (fetch (REGION WIDTH) of viewWindowIntersect)
                     (fetch (REGION HEIGHT) of viewWindowIntersect)])

(SubstituteCopiesForMapElements
   [LAMBDA (map name)                                      (* Bob&John "25-Sep-87 01:43")

(* * Recursive function to map through a list, returning a copy with copies of all instances of
        PictureSpecification substituted for the originals.)

(if map
        then (CONS (CAR map)
                   (CONS (← (CADR map)
                            Copy
                            (if name
                                then (NEWSYM name)))
                         (for submap in (CDDR map) collect (
                                                    SubstituteCopiesForMapElements
                                                            submap name]))

(DECLARE: EVAL@COMPILE
[PUTPROPS InRegionOrShadow? MACRO (LAMBDA (regionOrShadow x y)
                                          (* jdc "12-Apr-86 23:19")
                                          (if (AND (BOUNDP regionOrShadow)
                                                   (type? BITMAP (GETATOMVAL regionOrShadow)))
                                              then
                                              (NOT (ZEROP (BITMAPBIT (GETATOMVAL regionOrShadow)
                                                                     x y)))
                                              elseif
                                              (type? REGION regionOrShadow)
                                              then
                                              (INSIDEP regionOrShadow x y)
                                              else
                                              (SHOULDNT "Can't decipher regionOrShadow."]
)
(RPAQ PictureNotSpecifiedBitmap (READBITMAP))
(145 40
"00000000000000000000000000000000000000H@@@"
"00000000000000000000000000000000000000H@@@"
"00000000000000000000000000000000000000H@@@"
"00000000000000000000000000000000000000H@@@"
"00000000L@CNGL@0@@BGOC@@GH@A0000000000H@@@"
"00000000L@ANG@@G@@BGOC@@CH@A0000000000H@@@"
"00000000LOHNGANCOCNGOCCOAI0000000000H@@@"
"00000000LOLNFCOCOCNGOCCOII0000000000H@@@"
"00000000LOLNFGOOOCNGOCCOII0000000000H@@@"
"00000000LOHNFGOOOCNGOCCOAH@C000000000H@@@"
"00000000L@ANFGOOOCNGOC@@CH@C000000000H@@@"
"00000000L@CNFGOOOCNGOC@@CI0000000000H@@@"
"00000000LOONFGOCOCNGOCCOAI0000000000H@@@"
"00000000LOONFCOCOCNGOCCOII0000000000H@@@"
"00000000LOONGANCOCNCNCCOII0000000000H@@@"
"00000000LOONG@@GOCO@@GCOIH@A0000000000H@@@"
"00000000LOONGL@OOCOH@OCOHH@A0000000000H@@@"
"00000000000000000000000000000000000000H@@@"
"00000000000000000000000000000000000000H@@@"
"00000000000000000000000000000000000000H@@@"
"00000000000000000000000000000000000000H@@@"
"00000000000000000000000000000000000000H@@@"
"00000000000000000000000000000000000000H@@@"
```

```
"OAOIO@CN@@GOL@O@@O@@CN@GLL@@LL@@L@GOH@@@"
"OAOIL@@N@@GOH@G@@G@@CH@CLL@@LL@@L@AOH@@@"
"O@OILGHONGOOANCCNCCOOHOALLOOLLOOLO@OH@@@"
"O@GIHOLGNGOOCOCCOCCOOAOILLOOLLOOLOLOH@@@"
"OBGIIONGNGOO@OOCOCCOOCOOLLOOLLOOLOLGH@@@"
"OCCIIONGNGOOH@OCNC@@GCOOLL@CLL@ALONGH@@@"
"OCAIIONGNGOON@G@@G@@GCOOLL@CLL@ALONGH@@@"
"OCIIIONGNGOOONC@@OCOOCOOLLOOLLOOLONGH@@@"
"OCLIIONGNGOOCOCCOOCOOCOILLOOLLOOLOLGH@@@"
"OCLAHOLGNGOOCOCCOOCOOAOILLOOLLOOLOLOH@@@"
"OCNALGHONGOOANCCOOCOOHOALLOOLLOOLO@OH@@@"
"OCOAL@@ONGOOH@GCOO@@CH@CLLOOLL@@L@AOH@@@"
"OCOAO@CONGOOL@OCOO@@CN@GLLOOLL@@L@GOH@@@"
"OOOOOOOOOOOOOOOOOOOOOOOOOOOOOOOOOOOOH@@@"
"OOOOOOOOOOOOOOOOOOOOOOOOOOOOOOOOOOOOH@@@"
"OOOOOOOOOOOOOOOOOOOOOOOOOOOOOOOOOOOOH@@@"
"OOOOOCOOOOOOOOOOOOOOOOOOOOOOOOOOOOOOH@@@")
(PUTPROPS CHIPSGRAPHICS COPYRIGHT ("University of Pittsburgh" 1987))
(DECLARE: DONTCOPY
  (FILEMAP (NIL (12200 35903 (DisplayObjectManager.AddJustInBack 12210 . 12574) (
DisplayObjectManager.AddJustInFront 12576 . 12917) (DisplayObjectManager.DrawUnder 12919 . 14830) (
DisplayObjectManager.InformThoseILandedOn 14832 . 15281) (DisplayObjectManager.PrepareToMove 15283 .
16262) (DisplayObjectManager.RemoveFromOccludedByMeList 16264 . 16589) (
DisplayObjectManager.RemoveFromOccludesMeList 16591 . 16913) (DisplayObjectManager.ToTop 16915 . 17533
) (DisplayObjectManager.WhoDoIOverlap? 17535 . 18054) (GraphicalRelationshipsMixin.Above? 18056 .
18770) (GraphicalRelationshipsMixin.AdjacentTo? 18772 . 19737) (GraphicalRelationshipsMixin.Below?
19739 . 20458) (GraphicalRelationshipsMixin.Inside? 20460 . 22596) (
GraphicalRelationshipsMixin.Intersects? 22598 . 24742) (GraphicalRelationshipsMixin.LeftOf? 24744 .
25464) (GraphicalRelationshipsMixin.Obscures? 25466 . 25922) (GraphicalRelationshipsMixin.Occludes?
25924 . 26360) (GraphicalRelationshipsMixin.RightOf? 26362 . 27080) (PictureSpecification.Draw 27082
. 27823) (PictureSpecification.GetBitmap 27825 . 28254) (PictureSpecification.GetHeight 28256 . 28956
) (PictureSpecification.GetWidth 28958 . 29655) (PictureSpecification.OnYou? 29657 . 30283) (
SketchMixin.ConvertEditRepToDisplayRep 30285 . 32064) (SketchMixin.Copy 32066 . 32972) (
SketchMixin.CopyEditRepresentation 32974 . 33321) (SketchMixin.EditPicture 33323 . 35272) (
SketchMixin.MakeCommandMenu 35274 . 35901)) (35904 42399 (ConvertScreenToWindowCoords 35914 . 36658) (
ConvertWindowToScreenCoords 36660 . 37418) (DeleteFromMap 37420 . 37919) (GetMapElementFromName 37921
. 38444) (GetNameForCopy 38446 . 38819) (InsertInMap 38821 . 39291) (InterpretMap 39293 . 39850) (
SetupUnderImageBackground 39852 . 41793) (SubstituteCopiesForMapElements 41795 . 42397)))))
STOP
```

We claim:

1. A system for the interactive design of user manipulable graphic elements, comprising
   a) a computer having a display and stored tasks wherein the appearance of said graphic elements and methods for their manipulation are defined, each said graphic element being defined by at least one figure specification defining the appearance of said graphic element and at least one other type specification defining one or more areal properties of one or more portions of said graphic element,
   b) an interactive display editor program for defining the figure specification and said other type specifications of said graphic elements,
   c) an interactive program editor program for programming data and said methods associated with said graphic elements, and
   d) program means using the figure specification and said other type specifications for assembling said graphic elements upon the display and enabling user manipulation of said graphic elements.

2. Systems according to claim 1 wherein said display editor has means for copying said figure specification and said other type specifications to form copied specifications and for modifying said copied specifications for creating additional other type specifications.

3. A system for the interactive design of user manipulable graphic elements, comprising
   a) a computer having a bit mapped display and stored tasks comprising an object oriented programming environment wherein the appearance of said graphic elements and methods for their manipulation are defined by display objects, each said display object comprising at least one bit mapped figure specification instance variable defining the appearance of said display object and at least one other bit mapped type specification instance variable defining one or more areal properties of one or more portions of said display object,
   b) an interactive display editor program for defining said bit mapped figure specification instance variables and said other bit mapped type specification instance variables of said display objects,
   c) an interactive program editor program for programming data and said methods associated with said display objects and other objects of said programming environment, and
   d) program means using said bit mapped figure specification instance variables and said other bit mapped type specification instance variables for assembling said graphic elements upon the display and enabling user manipulation of said graphic elements.

4. A system for the interactive design of user manipulable graphic elements, comprising
   a) a computer having a bit mapped display and stored tasks comprising an object oriented programming environment wherein the appearance of said graphic elements and methods for their manipulation are defined by display objects, each said display object comprising at least one bit mapped figure specification instance variable defining the appearance of said display object and at least one bit mapped mask specification instance variable,
   b) an interactive display editor program for defining said bit mapped figure specification instance variables and said bit mapped mask specification instance variables of said display objects,
   c) an interactive program editor program for programming data and said methods associated with said display objects and other objects of said programming environment, and d) program means using said bit mapped figure specification instance variable and said bit mapped mask specification instance variables for assembling said graphic elements upon the display and enabling manipulation of said graphic elements, said mask specification instance variables defining nontransparent portions of said graphic elements, said display editor program having means for establishing and maintaining a list defining occlusion priorities of said graphic elements, said program means for assembling said graphic elements upon the display comprising means for defining one or more collections of overlaid graphic elements, each of said collections being formed by moving one or more of said graphic elements to a position in which said moved graphic elements geometrically overlap one or more other of said graphic elements to create overlaid portions and a second program means for controlling the display such that said nontransparent portions of said graphic elements of each said collection having higher occlusion priorities mask all said overlaid portions of graphic elements having lower occlusion priorities.

5. A system for the interactive design of user manipulable graphic elements displayed upon a computer display, comprising a) a computer having a bit mapped display, a mouse for input, said mouse having one or more mouse buttons, a keyboard input capability and stored tasks comprising an object oriented programming environment wherein the appearance of said graphic elements and methods for their manipulation are defined by display objects, said display object comprising at least one bit mapped figure specification instance variable defining the appearance of said display object and at least one bit mapped map specification instance variable, b) an interactive display editor program for defining said bit mapped figure specification instance variables and said bit mapped map specification instance variables of said display objects, c) an interactive program editor program for programming data and said methods associated with said display objects and other objects of said programming environment, and d) program means using said bit mapped figure specification instance variables for assembling said graphic elements upon the display and for displaying a mouse cursor within said display, said map specification instance variables defining mouse sensitive portions of said graphic element as a tagged list or list tree of bit maps, said program editor program having means for defining one or more of said methods to be activated when the mouse is used to bring the mouse cursor over said mouse sensitive areas of said graphic element and one of said mouse buttons has been pushed while the mouse cursor is within a mouse sensitive area.

6. A system for the interactive design of user manipulable graphic elements displayed upon a computer display, comprising a) a computer having a bit mapped display, a mouse input, said mouse having one or more mouse buttons, a keyboard input capability and stored tasks comprising an object oriented programming environment allowing messages to be exchanged between objects and wherein the appearance of said graphic elements and methods for their manipulation are defined by display objects, each said display object comprising at least one bit mapped figure specification instance variable defining the appearance of said display object, at least one bit mapped mask specification instance variable and at least one bit mapped map specification instance variable, b) a display editor program for defining said bit mapped figure, mask and map specification instance variables of said display objects, c) a program editor program for programming data and said methods assigned to said display objects and other objects of said programming environment, and d) a program means using said bit mapped figure, mask and map specification instance variables for assembling said graphic elements upon the display and for displaying a mouse cursor within said display, said mask specification instance variables defining nontransparent portions of said graphic element, said display editor program or said program editor program having means for assigning occlusion priorities to each said graphic element, said program means further having means for defining one or more collections of overlaid graphic elements, each of said collections being formed by moving one or more of said graphic elements to a position in which said moved graphic elements geometrically overlap one or more other of said graphic elements to create overlaid portions, and a second program means for controlling the display such that said nontransparent portions of said graphic elements of each said collection having higher occlusion priorities mask all said overlaid portions of graphic elements having lower occlusion priorities, said map specifications defining mouse sensitive portions of at least one said graphic element, said program editor having means for defining one or more of said methods or messages to be activated when the mouse is used to bring the mouse cursor over said mouse sensitive areas of said graphic element and one of said mouse buttons is pushed.

7. Systems according to any one of claims 3 to 6 wherein said display editor has means for creating multiple sets of bit mapped specification instance variables associated with a given display object which sets of specification instance variables are selectable by messages sent to the display object.

8. Systems according to any one of claims 3 to 6 wherein said display editor has means for copying said bit mapped specification instance variables to yield copied specification instance variables and modifying said copied specification instance variables for creating additional bit mapped type specification instance variables.

9. A computer assisted process for the interactive design of user manipulable graphic elements displayed on a computer display, said method requiring a computer having tasks wherein the appearance of said graphic elements and methods for their manipulation are defined, each said graphic element bring defined by at least one figure specification defining the appearance of said graphic element and at least one other type specification defining one or more areal properties of one or more portions of said graphic element, an interactive display editor program for defining the figure specification and said other type specifications of said graphic elements, a program editor program for programming data and said methods associated with said graphic elements, and a program means for assembling said graphic elements upon the display and enabling the manipulation of said graphic elements, comprising the steps of a) using the display editor program to interactively define said figure specification of a new graphic element, and b) using the display editor program to interactively define at least one of said other type specifications of said new graphic element.

10. A process according to claim 9 wherein figure specifications are copied and modified to define specifications of new display objects.

11. A computer assisted process for the interactive design of user manipulable graphic elements displayed upon a computer display, said method requiring a computer having an object oriented programming environment wherein the appearance of said graphic elements and methods for their manipulation are defined, each said graphic element being defined by display objects, each said display object comprising at least one bit mapped figure specification instance variable defining the appearance of said graphic element and at least one other bit mapped type specification instance variable defining one or more areal properties of one or more portions of said graphic element, an interactive display editor program for defining the figure specification instance variables and said other bit mapped type specification instance variables of said display objects, a program editor program for programming data and said methods assigned to said display objects and other objects of said programming environment, and a program means for assembling said graphic elements upon the display and enabling the manipulation of said graphic elements, comprising the steps of a) using the display editor program to interactively define the bit mapped figure specification instance variables of a new graphic element, the data for which figure specification instance variables are associated with a display object corresponding to said new graphic element, and b) using the display editor program to interactively define at least one other bit mapped type specification instance variables of said new graphic element, the data for which other type specification instance variables are associated with a display object corresponding to said new graphic element.

12. A computer assisted process for the interactive design of user manipulable graphic elements displayed upon a computer display, said method requiring a computer having a bit mapped display and an object oriented programming environment wherein the appearance of said graphic elements and methods for their manipulation are defined by display objects, each said display object comprising at least one bit mapped figure specification instance variable defining the appearance of said graphic element and at least bit mapped mask specification instance variable defining nontransparent portions of said graphic element, an interactive display editor program for defining the bit mapped figure and mask specification instance variables of said display objects, a program editor program for programming data and said methods assigned to said display objects and other objects of said programming environment, and a display program means, said display program means supporting windows, for assembling said graphic elements upon the display and enabling the interactive positioning and repositioning of said graphic elements at locations within one or more of said windows, comprising the steps of a) using the display editor program to interactively define the bit mapped figure specification instance variables of a new graphic element, the data for which figure specification instance variables are associated with a display object corresponding to said new graphic element, b) using the display editor program to interactively define the bit mapped mask specification instance variables defining transparent and nontransparent portions of said new graphic element, the data for which map specification instance variables are associated with a display object corresponding to said new graphic element, c) repeating steps a) and b) one or more times to define a plurality of display objects, and d) using either the display editor program or the program editor program for assigning occlusion priorities to each display object such that when the display program means is invoked to move one or more of said new graphic elements to a position in which said moved graphic elements geometrically overlap one or more of other said graphic elements to created overlaid portions, said nontransparent portions of said graphic elements having higher occlusion priorities mask all said overlaid portions of graphic elements having lower occlusion priorities.

13. A computer assisted process for the interactive design for user manipulable graphic elements displayed upon a computer display, said method requiring a computer having a bit mapped display, a mouse for input, said mouse having one or more mouse buttons, a keyboard input capability and an object oriented programming environment allowing messages to be exchanged between objects and wherein the appearance of said graphic elements and methods for their manipulation are defined by display objects, each said display object comprising at least one bit mapped figure specification instance variable defining the appearance of said graphic element and at least one other bit mapped type specification instance variable defining one or more areal properties of one or more portions of said graphic element, an interactive display editor program for defining the bit mapped figure specification instance variables and said other bit mapped type specification instance variables of said display objects, a program editor program for programming data and said methods assigned to said display objects and other objects of said programming environment, and a display program means for assembling graphic elements upon the display and displaying a mouse cursor, comprising the steps of a) using the display editor program to interactively define the bit mapped figure specification instance variables of a new graphic element, the data for which figure specification instance variables are associated with a display object corresponding to said graphic element, b) using the display editor program and the program editor program to interactively define the bit mapped map specification instance variables defining mouse sensitive portions of at least one said new graphic element, the data for which map specification instance variables are associated with a display object corresponding to said graphic element, and c) using the program editor program to define one or more of said methods or messages to be activated when the mouse is used to bring the mouse cursor over said mouse sensitive areas of said graphic element and one of said mouse buttons is pushed.

14. A computer assisted process for the interactive design of user manipulable graphic elements displayed upon a bit mapped computer display, said graphic elements being comprised of at least bit mapped figure specification instance variables defining the appearance of said graphic elements, bit mapped mask specification instance variables defining the transparent and nontransparent portions of said graphic elements, and bit mapped map specification instance variables defining mouse sensitive portions of said graphic elements, said process requiring a computer having a mouse for input, said mouse having one or more mouse buttons, a keyboard input capability and having an object oriented programming environment with an interactive display editor program for defining elements of display objects representing said graphic elements, a program editor program for programming data and methods for manipulating objects assigned to said display objects and to other objects of said programming environment, and a display program means, said display program means supporting windows, for assembling said graphic elements within at least one of said windows defined upon the display and enabling the interactive positioning and repositioning of said graphic elements at locations within one or more of said windows, comprising the steps of
- a) using the display editor program to interactively define bit mapped figure specification instance variables of a new graphic element, the data for which figure specification instance variables are associated with a display object corresponding to said new graphic element,
- b) using the display editor program to interactively define bit mapped mask specification instance variables defining transparent and nontransparent portions of said new graphic element, the data for which mask specification instance variables are associated with a display object corresponding to said new graphic element,
- c) repeating steps a) and b) one or more times to define a plurality of display objects,
- d) using either the display editor program or the program editor program for assigning occlusion priorities to each of said new graphic elements by storing data in at least one of said instance variables associated with each display object such that when the display program means is invoked to move one or more of said graphic elements to a position in which said moved graphic elements geometrically overlap one or more of other said graphic elements to created overlaid portions, said nontransparent portions of said graphic elements having higher occlusion priorities mask all said overlaid portions of graphic elements having lower occlusion priorities,
- e) using the display editor program and the program editor program to interactively define one or more of said map specification instance variables of at least one said new graphic element, the data for which map specification instance variables are associated with a display object corresponding to said new graphic element, and
- f) using the program editor program to define one or more of said methods or messages to be activated when the mouse is used to bring the mouse cursor over said mouse sensitive areas of said graphic element and one of said mouse buttons is pushed, said methods and messages being associated with a display object corresponding to said graphic element.

15. A computer assisted process for the interactive design of user manipulable graphic elements associated with an application domain and displayed upon a bit mapped computer display, said graphic elements being comprised of at least bit mapped figure specification instance variables defining the appearance of said graphic elements, bit mapped mask specification instance variables defining the transparent and nontransparent portions of said graphic elements, and bit mapped map specification instance variables defining mouse sensitive portions of said graphic elements, said graphic elements comprising the visual representations of programming items, said process requiring a computer having a mouse for input, said mouse having one or more mouse buttons, a keyboard input capability and having an object oriented programming environment with an interactive display editor program for defining elements of display objects representing said graphic elements, a program editor program for programming data and methods for manipulating objects assigned to said display objects and to other objects of said programming environment, and a display program means, said display program means supporting windows, for assembling said graphic elements within at least one of said windows defined upon the display and enabling the interactive positioning and repositioning of said graphic elements at locations within one or more of said windows, comprising the steps of
- a) using the display editor program to interactively define bit mapped figure specification instance variables of a new graphic element, the data for which figure specification instance variables are associated with a display object corresponding to said new graphic element,
- b) using the display editor program to interactively define bit mapped mask specification instance variables, the data for which mask specification instance variables are associated with a display object corresponding to said new graphic element,
- c) repeating steps a) and b) one or more times to define a plurality of display objects,
- d) using either the display editor program or the program editor program for assigning occlusion priorities to each of said new graphic elements by storing data in at least one of said instance variables associated with each display object such that when the display program means is invoked to move one or more of said graphic elements to a position in which said moved graphic elements geometrically overlap one another or more of other said graphic elements to created overlaid portions, said nontransparent portions of said graphic elements having higher occlusion priorities mask all said overlaid portions of graphic elements having lower occlusion priorities,
- e) using the display editor program and the program editor program to interactively define one or more of said map specification instance variables of at least one said new graphic element, the data for which map specification instance variables are associated with a display object corresponding to said new graphic element, f) using the program editor program to define one or more of said methods or messages to be activated when the mouse is used to bring the mouse cursor over said mouse sensitive areas of said graphic element and one of said mouse buttons is pushed, said methods and messages being stored at instance variables associated with the display object corresponding to said graphic element, and g) using the program editor program to define methods for domain objects, said domain objects representing objects from said application domain and said methods specifying the function of said programming items and for exchanging messages with a display object defining the visual representation of said programming items.

16. A process according to any one of claims 11 to 15 wherein each display object may have multiple sets of figure specification instance variables associated therewith, said sets being selectable by messages sent to the display object.

17. A process according to any one of claims 11 to 15 wherein sets of figure specification instance variables are copied and modified to define specification instance variables of new display objects.

* * * * *